United States Patent
Farag et al.

(10) Patent No.: US 12,356,475 B2
(45) Date of Patent: Jul. 8, 2025

(54) SIDELINK NETWORK ASSISTED INTER-UE COORDINATION

(71) Applicant: Samsung Electronics Co., Ltd., Suwon-si (KR)

(72) Inventors: Emad N. Farag, Flanders, NJ (US); Kyeongin Jeong, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 597 days.

(21) Appl. No.: 17/454,027

(22) Filed: Nov. 8, 2021

(65) Prior Publication Data

US 2022/0159752 A1 May 19, 2022

Related U.S. Application Data

(60) Provisional application No. 63/121,017, filed on Dec. 3, 2020, provisional application No. 63/115,401, filed on Nov. 18, 2020.

(51) Int. Cl.
*H04W 72/40* (2023.01)
*H04W 72/25* (2023.01)
*H04W 76/14* (2018.01)

(52) U.S. Cl.
CPC .................... *H04W 76/14* (2018.02)

(58) Field of Classification Search
CPC ..... H04W 72/02; H04W 72/20; H04W 72/25; H04W 72/51; H04W 72/56;
(Continued)

(56) References Cited

U.S. PATENT DOCUMENTS 10,383,147 B2 * 8/2019 Rajagopal ......... H04W 28/0284
11,025,374 B2 * 6/2021 Guo ....................... H04L 1/1822
(Continued)

FOREIGN PATENT DOCUMENTS

CN 110831174 A 2/2020
EP 3836687 A1 6/2021
(Continued)

OTHER PUBLICATIONS

"5G; NR; Physical channels and modulation (3GPP TS 38.211 version 16.7.0 Release 16)", ETSI TS 138 211 V16.7.0, Oct. 2021, 138 pages.
(Continued)

*Primary Examiner* — Sai Aung

(57) ABSTRACT

Methods and apparatuses for sidelink (SL) network assisted inter-user equipment (UE) coordination in a wireless communication system. A method for operating a UE includes receiving, on a Uu interface, a message associated with SL inter-UE coordination information, determining SL resources for a SL transmission based on the SL inter-UE coordination information, selecting the SL resources for the SL transmission, and transmitting on a SL interface using the SL resources. A method of operating a BS includes receiving, on a Uu interface, a message including first SL inter-UE coordination information from a first UE, determining a second UE as a recipient for the first SL inter-UE coordination information, generating second SL inter-UE coordination information from aggregation of the first SL inter-UE coordination information and other SL inter-UE coordination information, and transmitting the second SL inter-UE coordination information to the second UE.

18 Claims, 16 Drawing Sheets

(58) Field of Classification Search
CPC ....... H04W 72/542; H04W 4/08; H04W 4/40; H04W 74/0808; H04W 76/14; H04W 92/178
See application file for complete search history.

(56) References Cited

U.S. PATENT DOCUMENTS

| | | | |
|---|---|---|---|
| 2017/0150302 A1* | 5/2017 | Sorrentino | H04L 1/08 |
| 2017/0188391 A1* | 6/2017 | Rajagopal | H04W 74/0816 |
| 2017/0289733 A1* | 10/2017 | Rajagopal | H04L 5/0082 |
| 2019/0020987 A1* | 1/2019 | Khoryaev | H04W 76/14 |
| 2020/0037343 A1* | 1/2020 | He | H04W 28/0268 |
| 2020/0186290 A1* | 6/2020 | Zhang | H04L 1/0073 |
| 2020/0229171 A1* | 7/2020 | Khoryaev | H04W 4/40 |
| 2020/0305154 A1* | 9/2020 | Wu | H04L 5/0044 |
| 2020/0404069 A1* | 12/2020 | Li | H04L 67/59 |
| 2021/0006955 A1* | 1/2021 | Balasubramanian ... | H04W 4/40 |
| 2021/0029585 A1* | 1/2021 | Bharadwaj | H04W 28/26 |
| 2021/0345145 A1* | 11/2021 | Sarkis | H04L 5/16 |
| 2022/0046653 A1* | 2/2022 | Hosseini | H04W 72/20 |
| 2022/0255680 A1* | 8/2022 | Moon | H04L 5/0055 |
| 2022/0361069 A1* | 11/2022 | Zhang | H04W 76/14 |
| 2022/0368504 A1* | 11/2022 | Zhao | H04L 5/0055 |
| 2023/0103205 A1* | 3/2023 | Guo | H04W 72/21 370/329 |

FOREIGN PATENT DOCUMENTS

| | | |
|---|---|---|
| WO | 2019028900 A1 | 2/2019 |
| WO | 2019192701 A1 | 10/2019 |
| WO | 2020197294 A1 | 10/2020 |

OTHER PUBLICATIONS

"5G; NR; Multiplexing and channel coding (3GPP TS 38.212 version 16.7.0 Release 16)", ETSI TS 138 212 V16.7.0, Oct. 2021, 157 pages.
"5G; NR; Physical layer procedures for control (3GPP TS 38.213 version 16.7.0 Release 16)", ETSI TS 138 213 V16.7.0, Oct. 2021, 191 pages.
"5G; NR; Physical layer procedures for data (3GPP TS 38.214 version 16.7.0 Release 16)", ETSI TS 138 214 V16.7.0, Oct. 2021, 176 pages.
"5G; NR; Medium Access Control (MAC) protocol specification (3GPP TS 38.321 version 16.6.0 Release 16)", ETSI TS 138 321 V16.6.0, Oct. 2021, 160 pages.
"5G; NR; Radio Resource Control (RRC); Protocol specification (3GPP TS 38.331 version 16.6.0 Release 16)", ETSI TS 138 331 V16.6.0, Oct. 2021, 948 pages.
"LTE; Evolved Universal Terrestrial Radio Access (E-UTRA); Physical layer procedures (3GPP TS 36.213 version 16.7.1 Release 16)", ETSI TS 136 213 V16.7.1, Oct. 2021, 581 pages.
LG Electronics, "WID revision: NR sidelink enhancement", 3GPP TSG RAN Meeting #88e, RP-201385, Jun. 2020, 6 pages.
International Search Report and Written Opinion of the International Searching Authority regarding International Patent Application No. PCT/KR2021/016941 dated Mar. 2, 2022, 7 pages.
Oppo, "Discussion on Inter-UE Coordination for sidelink", 3GPP TSG-RAN WG2 #112-e, R2-2008773, Nov. 2020, 2 pages.
ZTE Corporation et al., "Discussion on sidelink inter-UE coordination", 3GPP TSG-RAN WG2 Meeting #112-e, R2-2009028, Nov. 2020, 4 pages.
InterDigital Inc., "RAN2 Aspects of Resource Allocation with Inter-UE Coordination", 3GPP RAN WG2 Meeting #112-e, R2-2009212, Nov. 2020, 3 pages.
Fraunhofer HHI et al., "Resource Allocation Enhancements", 3GPP TSG RAN WG2 Meeting #112-e, R2-2009992, Nov. 2020, 6 pages.
Extended European Search Report issued Jan. 23, 2024 regarding Application No. 21895115.0, 10 pages.
European Patent Office, Communication pursuant to Article 94(3) EPC issued Apr. 2, 2025 regarding Application No. 21895115.0, 8 pages.

* cited by examiner

SIDELINK NETWORK ASSISTED INTER-UE COORDINATION

CROSS-REFERENCE TO RELATED APPLICATIONS AND CLAIM OF PRIORITY

The present application claims priority to U.S. Provisional Patent Application No. 63/115,401, filed on Nov. 18, 2020, and U.S. Provisional Patent Application No. 63/121,017, filed on Dec. 3, 2020. The content of the above-identified patent document is incorporated herein by reference.

TECHNICAL FIELD

The present disclosure relates generally to wireless communication systems and, more specifically, the present disclosure relates to sidelink (SL) network assisted inter-user equipment (UE) coordination in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates SL network assisted inter-UE coordination in a wireless communication system.

In one embodiment, a UE is provided. The UE includes a transceiver configured to receive, on a Uu interface, a message associated with SL inter-UE coordination information. The UE also includes a processor operably coupled to the transceiver. The processor is configured to determine SL resources for a SL transmission based on the SL inter-UE coordination information and select the SL resources for the SL transmission. The transceiver is further configured to transmit on a SL interface using the SL resources.

In another embodiment, a base station (BS) is provided. The BS includes a transceiver configured to receive, on a Uu interface, a message including first SL inter-UE coordination information from a first UE. The BS further includes a processor operably coupled to the transceiver. The processor is configured to determine a second UE as a recipient for the first SL inter-UE coordination information and generate second SL inter-UE coordination information from aggregation of the first SL inter-UE coordination information and other SL inter-UE coordination information. The transceiver is further configured to transmit the second SL inter-UE coordination information to the second UE.

In yet another embodiment, a method of operating a BS is provided. The method includes receiving, on a Uu interface, a message including first SL inter-UE coordination information from a first UE and determining a second UE as a recipient for the first SL inter-UE coordination information. The method further includes generating second SL inter-UE coordination information from aggregation of the first SL inter-UE coordination information and other SL inter-UE coordination information, and transmitting the second SL inter-UE coordination information to the second UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.7.0, "Physical channels and modulation"; 3GPP TS 38.212 v.16.7.0, "Multiplexing and channel coding"; 3GPP TS 38.213 v.16.7.0, "NR; Physical Layer Procedures for Control"; 3GPP TS 38.214: v.16.7.0, "Physical layer procedures for data"; 3GPP TS 38.321 v.16.6.0, "Medium Access Control (MAC) protocol specification"; 3GPP TS 38.331 v.16.6.0, "Radio Resource Control (RRC) protocol specification"; and 3GPP TS 36.213 v.16.7.1, "Evolved Universal Terrestrial Radio Access (E-UTRA); Physical layer."

Figure 1:
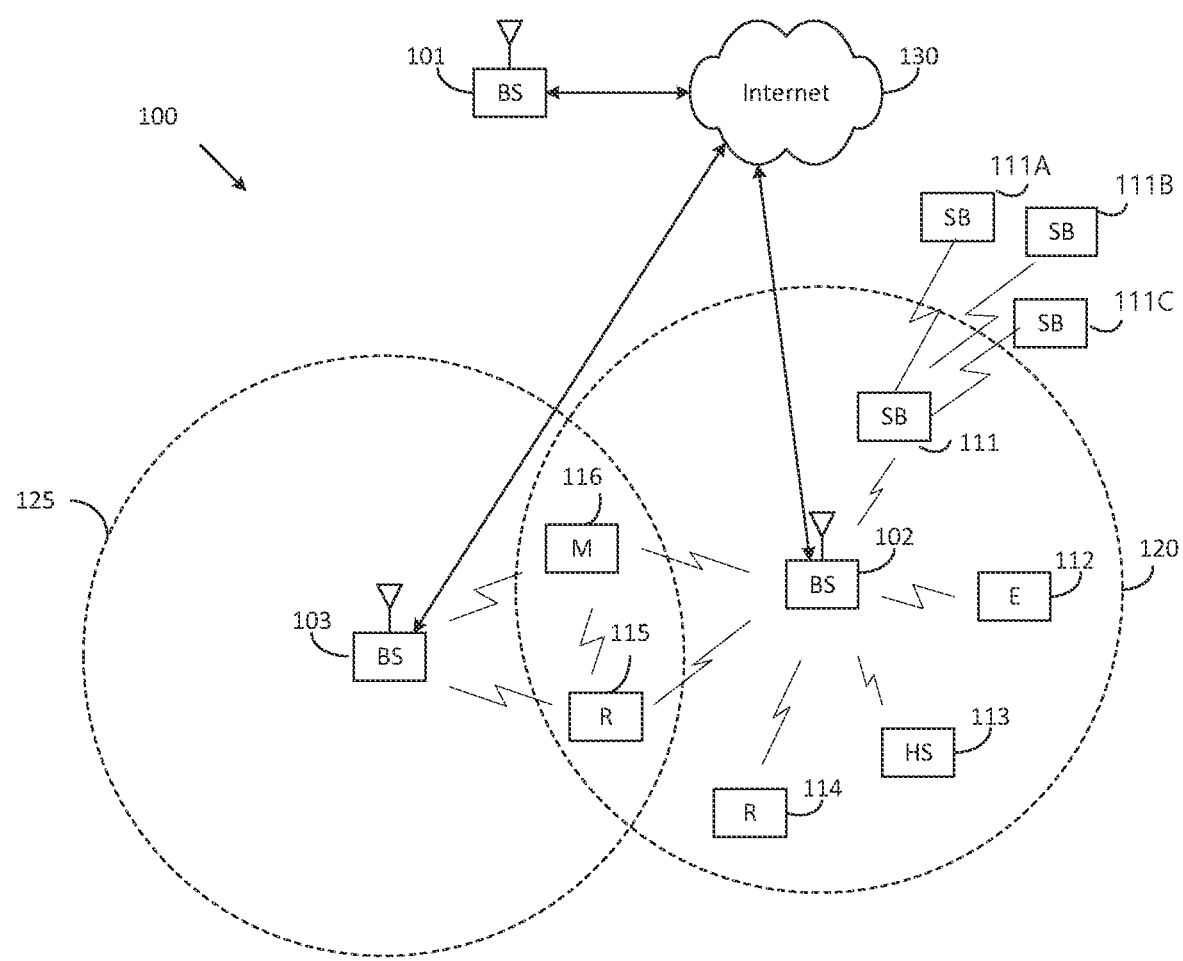
FIG. 1 illustrates an example wireless network according to various embodiments of the present disclosure.
Figure 2:
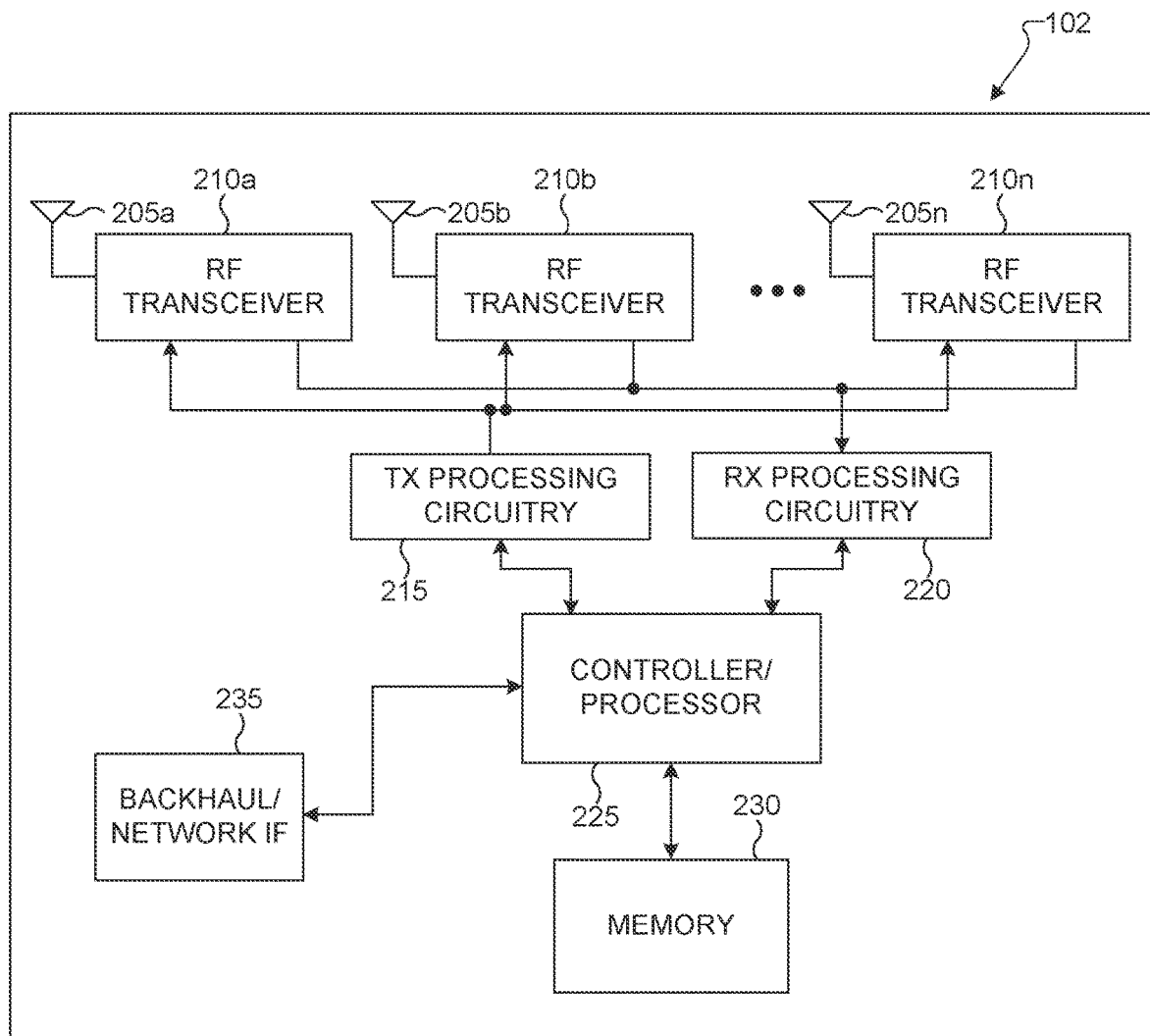
FIG. 2 illustrates an example gNB according to various embodiments of the present disclosure.
Figure 3:
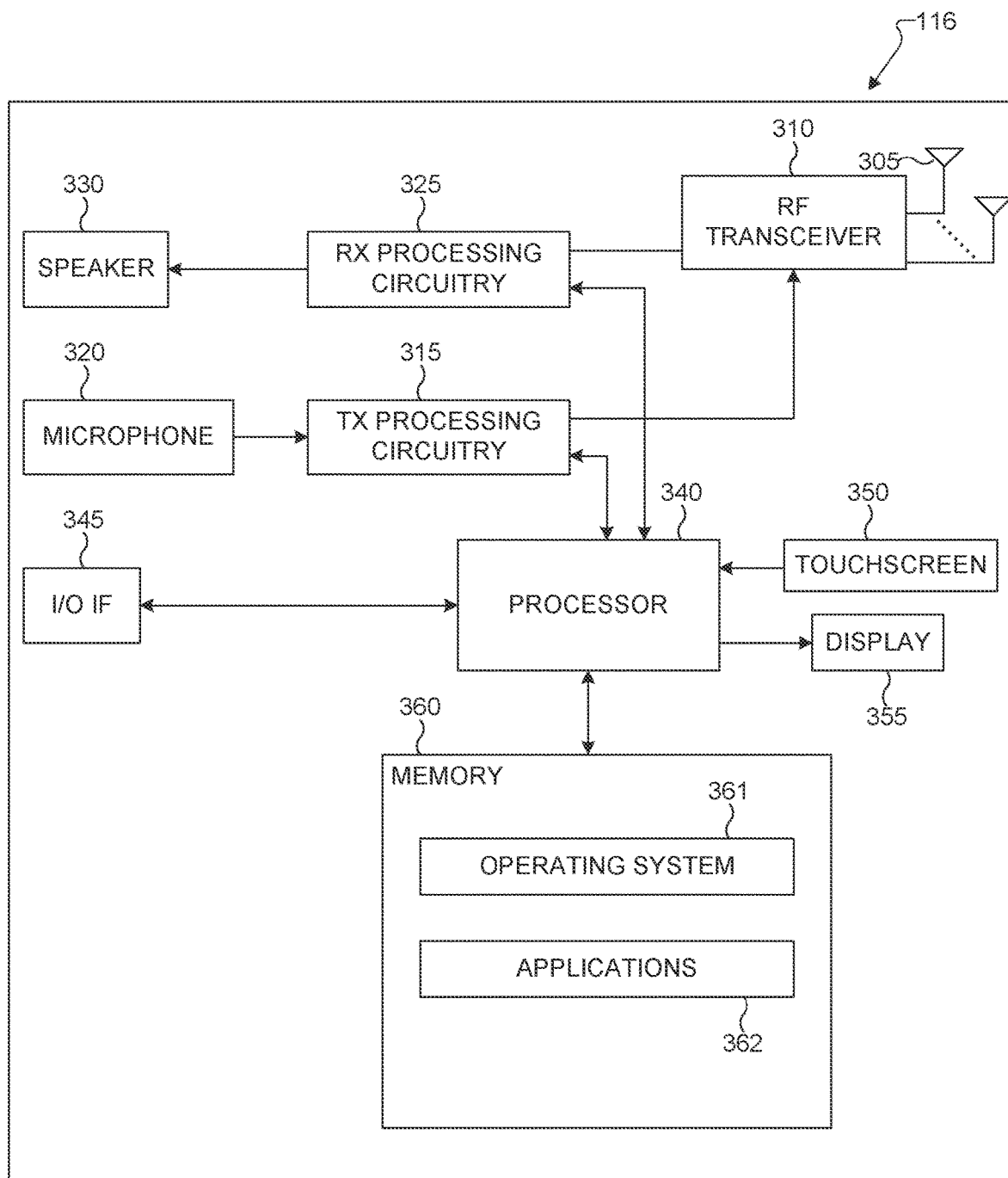
FIG. 3 illustrates an example UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In various embodiments, a UE 116 may communicate with another UE 115 via a sidelink (SL). For example, both UEs 115-116 can be within network coverage (of the same or different base stations). In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for SL network assisted inter-UE coordination in a wireless communication system. In certain embodiments, and one or more of the gNBs 101-103 includes circuitry, programing, or a combination thereof, for SL network assisted inter-UE coordination in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs (e.g., via a Uu interface or air interface, which is an interface between a UE and 5G radio access network (RAN)) and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., SB 111A to 111C) that may have a SL communication with the SB 111. The SB 111 can communicate directly with the SBs 111A to 111C through a set of SLs (e.g., SL interfaces) to provide sideline communication, for example, in situations where the SBs 111A to 111C are remotely located or otherwise in need of facilitation for network access connections (e.g., BS 102) beyond or in addition to traditional fronthaul and/or backhaul connections/interfaces. In one example, the SB 111 can have direct communication, through the SL communication, with SBs 111A to 111C with or without support by the BS 102. Various of the UEs (e.g., as depicted by UEs 112 to 116) may be capable of one or more communication with their other UEs (such as UEs 111A to 111C as for SB 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the SL network assisted inter-UE coordination in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100 or by other UEs (e.g., one or more of UEs 111-115) on a SL channel. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink and/or sidelink channel signals and the transmission of uplink and/or sidelink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for SL network assisted inter-UE coordination in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points and a sidelink (SL) that refers to transmissions from one or more UEs to one or more UEs.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
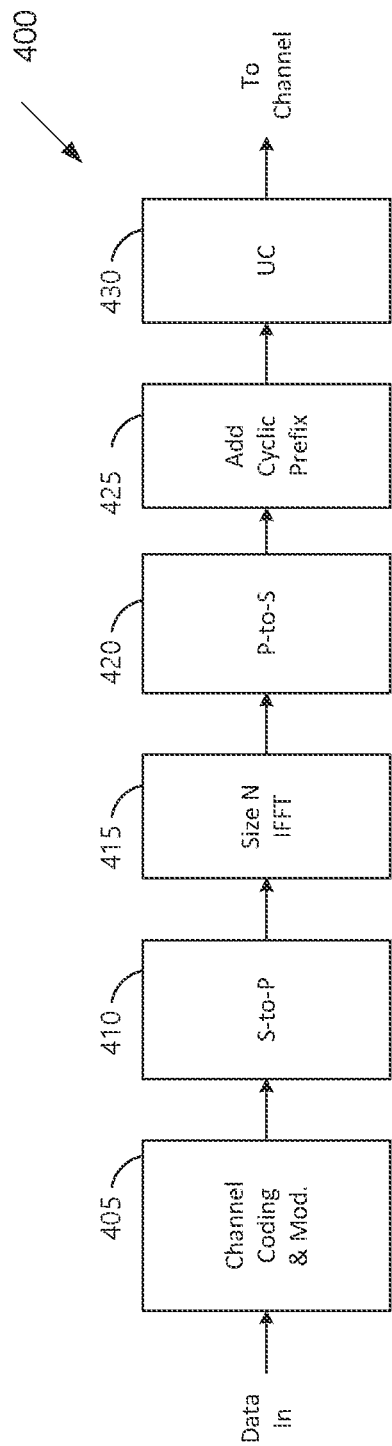
FIGS. 4 and 5 illustrate example wireless transmit and receive paths according to various embodiments of the present disclosure.
Figure 5:
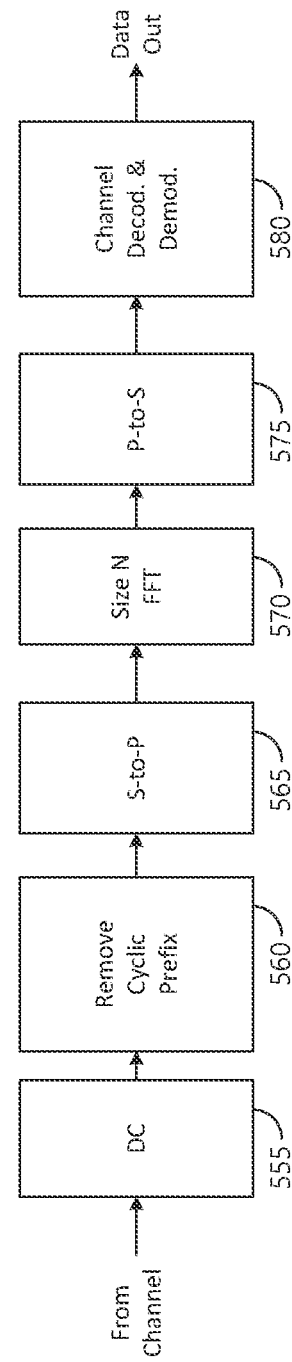

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support SL measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have a duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz.

An RB in one symbol of a slot is referred to as physical RB (PRB) and includes a number of resource elements (REs). A slot can be either full DL slot, or full UL slot, or hybrid slot similar to a special subframe in time division duplex (TDD) systems (see also REF 1). In addition, a slot can have symbols for SL communications. A UE can be configured one or more bandwidth parts (BWPs) of a system BW for transmissions or receptions of signals or channels. Furthermore, slots can be organized in subframes, wherein a subframe has a time duration of 1 ms. Subframes frames can be further organized in radio frames, or simply frames, wherein a frame has a duration of 10 ms.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization.

SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UEs. In a groupcast mode, a PSCCH/PSSCH conveys SL information from one UE to a group of UEs within a (pre-) configured set. In a broadcast mode, a PSCCH/PSSCH conveys SL information from one UE to all surrounding UEs.

In NR release 16, there are two resource allocation modes for a PSCCH/PSSCH transmission. In resource allocation mode 1, a gNB schedules a UE on the SL and conveys scheduling information to the UE transmitting on the SL through a DCI format. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a network can configure a UE one of two options for reporting of HARQ-ACK information by the UE.

In one example of HARQ-ACK reporting option (1), a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB.

In another example of HARQ-ACK reporting option (2), a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A SL resource pool includes a set/pool of slots and a set/pool of RBs used for SL transmission and SL reception. A set of slots which belong to a SL resource pool can be denoted by $\{t'^{SL}_0, t'^{SL}_1, t'^{SL}_2, \ldots, t'^{SL}_{T'_{MAX}-1}\}$ and can be configured, for example, at least using a bitmap. Where, $T'_{MAX}$ is the number of SL slots in a resource pool. Within each slot $t'^{SL}_y$ of a SL resource pool, there are $N_{subCH}$ contiguous sub-channels in the frequency domain for SL transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m \cdot n_{subCHsize}+j$, where j=0, 1, ..., $n_{subCHsize}-1$, $n_{subCHstart}$ and $n_{subCHsize}$ are provided by higher layer parameters.

The slots of a SL resource pool are determined as follows.

In one example, it may be assumed that a set of slots that may belong to a resource is denoted by $\{t^{SL}_0, t^{SL}_1, t^{SL}_2, \ldots, t^{SL}_{T_{MAX}-1}\}$, where $0 \le t^{SL}_i < 10240 \times 2^\mu$, and $0 \le i < T_{max}$, μ is the sub-carrier spacing configuration. μ=0 for a 15 kHz sub-carrier spacing. μ=1 for a 30 kHz sub-carrier spacing. μ=2 for a 60 kHz sub-carrier spacing. μ=8 for a 120 kHz sub-carrier spacing. The slot index is relative to slot #0 of SFN #0 of the serving cell, or DFN #0. In such example, the set of slots includes all slots except: (i) $N_{S-SSB}$ slots that are configured for SL SS/PBCH Block (S-SSB); (ii) $N_{nonSL}$ slots where at least one SL symbol is not not-semi-statically configured as UL symbol by higher layer parameter tdd-UL-DL-ConfigurationCommon or sl-TDD-Configuration. In a SL slot, OFDM symbols Y-th, (Y+1)-th, (Y+X−1)-th are SL symbols, where Y is determined by the higher layer parameter sl-StartSymbol and X is determined by higher layer parameter sl-LengthSymbols; and (iii) $N_{reserved}$ reserved slots. Reserved slots are determined such that the slots in the set $\{t_0^{SL}, t_1^{SL}, t_2^{SL}, \ldots, t_{T_{MAX}-1}^{SL}\}$ is a multiple of the bitmap length ($L_{bitmap}$), where the bitmap ($b_0, b_1, b_{L_{bitmap}-1}$) is configured by higher layers.

In such example, the reserved slots are determined as follows: (i) Let $\{l_0, l_1, \ldots, l_{2^\mu \times 10240 - N_{S-SSB} - N_{nonSL}-1}\}$ be the set of slots in range 0 . . . $2^\mu \times 10240-1$, excluding S-SSB slots and non-SL slots. The slots are arranged in ascending order of the slot index; (ii) the number of reserved slots is given by: $N_{reserved} = (2^\mu \times 10240 - N_{S-SSB} - N_{nonSL})$ mod $L_{bitmap}$; and (iii) the reserved slots $l_r$ are given by:

$$r = \left\lfloor \frac{m \cdot (2^\mu \times 10240 - N_{S-SSB} - N_{nonSL})}{N_{reserved}} \right\rfloor,$$

where, m=0, 1, . . . , $N_{reserved}-1$. $T_{max}$ is given by: $T_{max} = 2^\mu \times 10240 - N_{S-SSB} - N_{nonL} - N_{reserved}$.

In one example, the slots are arranged in ascending order of slot index.

In one example, the set of slots belonging to the SL resource pool, $\{t'_0^{SL}, t'_1^{SL}, t'_2^{SL}, \ldots, t'_{T'_{MAX}-1}^{SL}\}$, are determined as follows: (i) each resource pool has a corresponding bitmap ($b_0, b_1, \ldots, b_{L_{bitmap}-1}$) of length $L_{bitmap}$; (ii) a slot $t_k^{SL}$ belongs to the resource pool if $b_{k \bmod L_{bitmap}} = 1$; (iii) the remaining slots are indexed successively staring from 0, 1, . . . $T'_{MAX}-1$. Where, $T'_{MAX}$ is the number of remaining slots in the set.

Slots can be numbered (indexed) as physical slots or logical slots, wherein physical slots include all slots numbered sequential, while logical slots include only slots that can be allocated to SL resource pool as described above numbered sequentially. The conversion from a physical duration, $P_{rsvp}$, in milli-second to logical slots, $P'_{rsvp}$, is given by $$P'_{rsvp} = \left\lceil \frac{T'_{MAX}}{10240 \text{ ms}} \times P_{rsvp} \right\rceil$$

(see 3GPP 38.214).

For resource (re-)selection or re-evaluation in slot n, a UE can determine a set of available single-slot resources for transmission within a resource selection window [n+$T_1$, n+$T_2$], such that a single-slot resource for transmission, $R_{x,y}$ is defined as a set of $L_{subCH}$ contiguous subchannels x+i, where i=0, 1, . . . , $L_{subCH}-1$ in slot $t_y^{SL}$. $T_1$ is determined by the UE such that, $0 \leq T_1 \leq T_{proc,1}^{SL}$, where $T_{proc,1}^{SL}$ is a PSSCH processing time for example as defined in 3GPP standard specification. $T_2$ is determined by the UE such that $T_{2min} \leq T \leq$ Remaining Packet Delay Budget, as long as $T_{2min} <$ Remaining Packet Delay Budget, else $T_2$ is equal to the Remaining Packet Delay Budget. $T_{2min}$ is a configured by higher layers and depends on the priority of the SL transmission.

The resource (re-)selection is a two-step procedure: (i) the first step is to identify the candidate resources within a resource selection window. Candidate resources are resources that belong to a resource pool, but exclude resources that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. The resources excluded are based on reserved transmissions or semi-persistent transmissions that can collide with the excluded resources or any of reserved or semi-persistent transmissions; and (ii) the second step is to select or re-select a resource from the identified candidate resources.

During the first step of the resource (re-)selection procedure, a UE can monitor slots in a sensing window [n−$T_0$, n−$T_{proc,0}$), where the UE monitors slots belonging to a corresponding SL resource pool that are not used for the UE's own transmission. To determine a candidate single-slot resource set to report to higher layers, a UE excludes from the set of available single-slot resources for SL transmission within a resource pool and within a resource selection window, the following examples.

In one example, single slot resource $R_{x,y}$, such that for any slot $t'_m^{SL}$ not monitored within the sensing window with a hypothetical received SCI Format 1-0, with a "resource reservation period" set to any periodicity value allowed by a higher layer parameter reseverationPeriodAllowed and indicating all sub-channels of the resource pool in this slot, satisfies condition 2.2. below.

In one example, single slot resource $R_{x,y}$, such that for any received SCI within the sensing window: (i) the associated L1-RSRP measurement is above a (pre-)configured SL-RSRP threshold, where the SL-RSRP threshold depends on the priority indicated in the received SCI and that of the SL transmission for which resources are being selected; and (ii) (condition 2.2) The received SCI in slot $t'_m^{SL}$, or if "resource reservation field" is present in the received SCI the same SCI is assumed to be received in slot $t'_{m+q \times P'_{rsvp\_Rx}}^{SL}$, indicates a set of resource blocks that overlaps $R_{x,y+j \times P'_{rsvp\_Tx}}$.

In such example, q=1, 2, . . . , Q, where: (i) if $P_{rsvp\_RX} \leq T_{scal}$ and $$n' - m < P'_{rsvp\_Rx} \rightarrow Q = \left\lceil \frac{T_{scal}}{P_{rsvp\_RX}} \right\rceil.$$

$T_{scal}$ is $T_2$ in units of milli-seconds; (ii) Else Q=1; and (iii) if n belongs to ($t'_0^{SL}, t'_1^{SL}, \ldots, t'_{T'_{max}-1}^{SL}$), n'=n, else n' is the first slot after slot n belonging to set ($t'_0^{SL}, t'_0^{SL}, \ldots, t'_{T'_{max}-1}^{SL}$).

In such example, j=0, 1, . . . , $C_{resel}-1$, $P_{rsvp\_RX}$ is the indicated resource reservation period in the received SCI in physical slots, and $P'_{rsvp\_Rx}$ is that value converted to logical slots, and $P'_{rsvp\_Tx}$ is the resource reservation period of the SL transmissions for which resources are being reserved in logical slots.

In one example, if the candidate resources are less than a (pre-)configured percentage, such as 20%, of the total available resources within the resource selection window, the (pre-) configured SL-RSRP thresholds are increased by a predetermined amount, such as 3 dB.

An NR SL introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot $m-T_3$.

The re-evaluation check includes: (i) performing the first step of the SL resource selection procedure (see 3GPP 38.214), which involves identifying a candidate (available) SL resource set in a resource selection window as previously described; (ii) if the pre-selected resource is available in the candidate SL resource set, the resource is used/signaled for SL transmission; and (iii) else, the pre-selected resource is not available in the candidate SL resource set, a new SL resource is re-selected from the candidate SL resource set.

Pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot $m-T_3$.

When pre-emption check is enabled by higher layers, pre-emption check includes: (i) performing the first step of the SL resource selection procedure (3GPP 38.214), which involves identifying candidate (available) SL resource set in a resource selection window as previously described; (ii) if the pre-selected and reserved resource is available in the candidate SL resource set, the resource is used/signaled for SL transmission; and (iii) else, the pre-selected and reserved resource is NOT available in the candidate SL resource set. The resource is excluded from the candidate resource set due to an SCI, associated with a priority value $P_{RX}$, having an RSRP exceeding a threshold. Let the priority value of the SL resource being checked for pre-emption be $P_{TX}$.

In such example, if the priority value $P_{RX}$ is less than a higher-layer configured threshold and the priority value $P_{RX}$ is less than the priority value $P_{TX}$. The pre-selected and reserved SL resource is pre-empted. A new SL resource is re-selected from the candidate SL resource set. Note that, a lower priority value indicates traffic of higher priority. In such example, else, the resource is used/signaled for SL transmission.

As described above, the monitoring procedure for resource (re)selection during the sensing window requires reception and decoding of a SCI format during the sensing window as well as measuring the SL RSRP. This reception and decoding process and measuring the SL RSRP increases a processing complexity and power consumption of a UE for SL communication and requires the UE to have receive circuitry on the SL for sensing even if the UE only transmits and does not receive on the sidelink.

3GPP Release 16 is the first NR release to include SL through work item "5G V2X with NR sidelink," the mechanisms introduced focused mainly on vehicle-to-everything (V2X) and can be used for public safety when the service requirement can be met. Release 17 extends SL support to more use cases through work item "NR SL enhancement." One of the motivations for the SL enhancement in Release 17 is power savings.

Power saving enables UEs with battery constraint to perform SL operations in a power efficient manner. Rel-16 NR SL is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

One of the objectives of the Release 17 SL enhancement is to specify resource allocation enhancements that reduce power consumption, taking the principle of the release 14 LTE SL random resource selection and partial sensing as baseline with potential enhancements.

In one example of resource allocation enhancement, resource allocation to reduce power consumption of the UEs is specified. In one instance, a baseline introduces the principle of Rel-14 LTE SL random resource selection and partial sensing to Rel-16 NR SL resource allocation mode 2. In another instance, taking Rel-14 as the baseline does not preclude introducing a new solution to reduce power consumption for the cases where the baseline cannot work properly.

In one example, a motivation for the SL enhancement in Release 17 is provided to enhance reliability and reduced latency.

Enhanced reliability and reduced latency allow the support of URLLC-type SL use cases in wider operation scenarios. The system level reliability and latency performance of SL is affected by the communication conditions such as the wireless channel status and the offered load, and Rel-16 NR SL is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

Another objective of the Release 17 SL enhancement is to study the feasibility and benefits of enhancements to resource allocation mode 2, wherein a set of resources can be determined at a UE-A and sent to a UE-B, and the UE-B takes into account this set for its own transmission.

Study the feasibility and benefit of the enhancement(s) in mode 2 for enhanced reliability and reduced latency in consideration of both PRR and PIR defined in 3GPP TR37.885, and specify the identified solution if deemed feasible and beneficial.

In one example, an inter-UE coordination is provided with a set of resources that is determined at a UE-A. This set is sent to a UE-B in mode 2, and the UE-B takes this into account in the resource selection for its own transmission.

In some scenarios, for example for vulnerable road users (VRU) and pedestrian UEs (PUE), a low-cost, low-complexity and low-power terminal is desirable. In one example, the terminal may just transmit the location and/or motion information to surrounding UEs, within a communication range, to alert other UEs of the presence of the VRU. To avoid collision with other users, it would be desirable that the selected resource doesn't collide with other SL transmissions. As described earlier, in release 16 NR, a user senses the SL during a sensing window to avoid SL resources used by other users when selecting the SL resources of the user for transmission. Sensing increases the UE's power consumption and hence would not be suitable for UEs with limited battery energy such as VRUs and PUEs. Furthermore, a low-cost low complexity UE transmitting information on the SL may not have SL receiver, hence such a UE can't perform sensing before resource selection. Other schemes resource selection schemes with no sensing such as random selection would lead to a loss in performance due to a higher collision rate on the selected resources for SL transmission. However, if a user with no SL receiver were to receive assistance information from other UEs through a network, the UE with no SL receiver can exploit this information when making the decision for the UE to select a SL resource for the transmission of the UE.

The present disclosure provides methods for assisted resource selection for SL transmissions that mitigate and reduce a probability of resource collisions among UEs, wherein a UE can receive assistance information from a network, the information received assists the UE in selecting SL resources for the SL transmission and minimizes the probability of collision with other SL transmissions. Assistance information can include information based on sensing and/or inter-UE coordination information.

Resource selection assistance information (RSAI) or inter-UE co-ordination information can be transmitted from a first UE to a second UE can be sent directly or through a gNB, wherein the RSAI can be unicast, groupcast or broadcast to UEs, e.g., as described in U.S. patent application Ser. No. 17/224,983 filed Apr. 7, 2021, which is incorporated by reference herein.

The signaling of RSAI can be direct or through a gNB/eNB or another UE, e.g., as described in U.S. patent application Ser. No. 17/305,721 filed Jul. 13, 2021, which is incorporated by reference herein. In the present disclosure, design aspects related to the signaling of RSAI through a gNB or eNB are provided.

In some instances, the UE transmitting SL information (e.g., UE-B) is not aware of the SL environment at the UE receiving the SL information (UE-A), without receiving SL resource selection assistance information (i.e., inter-UE coordination information) from a UE-A. For example, the hidden node problem is when a third UE or node is causing interference or is attempting to transmit to the UE-A at the same time that a UE-B is attempting to transmit to the UE-A, but is not discerned by the UE-B. When the UE-A provides resource selection assistance information to the UE-B, the UE-A can assist the UE-B in making resource allocation decisions that avoid the hidden node problem when transmitting to the UE-A.

In another example, the exposed node problem is when a SL resource is being sensed as occupied at the UE-B, i.e., the UE transmitting the SL information, but is not being sensed as occupied at the UE-A, i.e., the UE receiving the SL information. If the UE-B were to only use sensing information the UE-B would not transmit on the resource to the UE-A. However, if the UE-B gets resource selection assistance information from the UE-A, the UE-B can allocate the resource for SL transmission to the UE-A. Resource selection assistance information, for example, can be whether a SL resource is preferred or not for SL transmission.

In some instances, the UE transmitting SL information (e.g., UE-B) is not aware whether the intended receiver UE of the SL information is receiving or transmitting at the time of transmission from a UE-B without receiving SL resource selection assistance information (i.e., inter-UE coordination information) from a UE-A.

For example, the half-duplex problem occurs when a first UE is transmitting information on a SL to a second UE at a time (i.e., in a slot and/or a symbol), when the second UE is transmitting and the second UE is unable to receive the SL transmission of the first UE. Resource selection assistance information, for example, can be whether a SL resource is preferred or not for SL transmission, and at least can be determined partially on whether a SL resource can be received by a second UE.

3GPP Release 16 is the first NR release to include SL through work item "5G V2X with NR sidelink," the mechanisms introduced focused mainly on vehicle-to-everything (V2X), and can be used for public safety when the service requirement can be met. Release 17 extends SL support to more use cases through work item "NR Sidelink enhancement". One of the motivations for the SL enhancement in Release 17 is power savings. A second motivation is enhanced reliability and latency.

One of the objectives of the Release 17 SL enhancement is to specify resource allocation enhancements that reduce power consumption. Another objective is to enhance reliability and reduce latency with resource allocation mode 2. In NR release 16, a UE performs sensing to determine available candidate resources for SL transmission to minimize probability of collision with other SL UEs. Sensing is a power consuming operation as the sensing requires a UE to monitor and receive the first part/stage SCI in every SL slot, a UE does not transmit in, as well as measure the SL RSRP, during the sensing window. Furthermore, sensing requires a UE to be equipped with a SL receiver.

Other techniques have been provided to reduce power dissipation by having no-sensing, in which case the UE does SL resource selection based on random selection. This scheme suffer from loss of SL performance due to increase SL collision probability due to lack of sensing. To address this issue, assisted SL resource selection is proposed, wherein the SL resource selection assistance information (e.g., inter-UE coordination information) is provide through a network. In the present disclosure, aspects related to the design and signaling of resource selection assistance information (e.g., inter-UE coordination information) through the network is provided.

As discussed, for example, in U.S. patent application Ser. No. 17/224,983 filed Apr. 7, 2021, which is incorporated by reference herein, a first UE or UEs, e.g., UE-A, also referred to as the controlling UE (or UEs) provides a set of resources and possibly other resource selection assistance information, referred to collectively as RSAI or SL assistance information (e.g., inter-UE co-ordination information), to a second UE or UEs, e.g., UE-B, also referred to as controlled UE (or UEs), wherein, RSAI from UE-A to UE-B can be transmitted through a network (e.g., gNB and/or eNB) as illustrated in FIG. 6.

Figure 6:
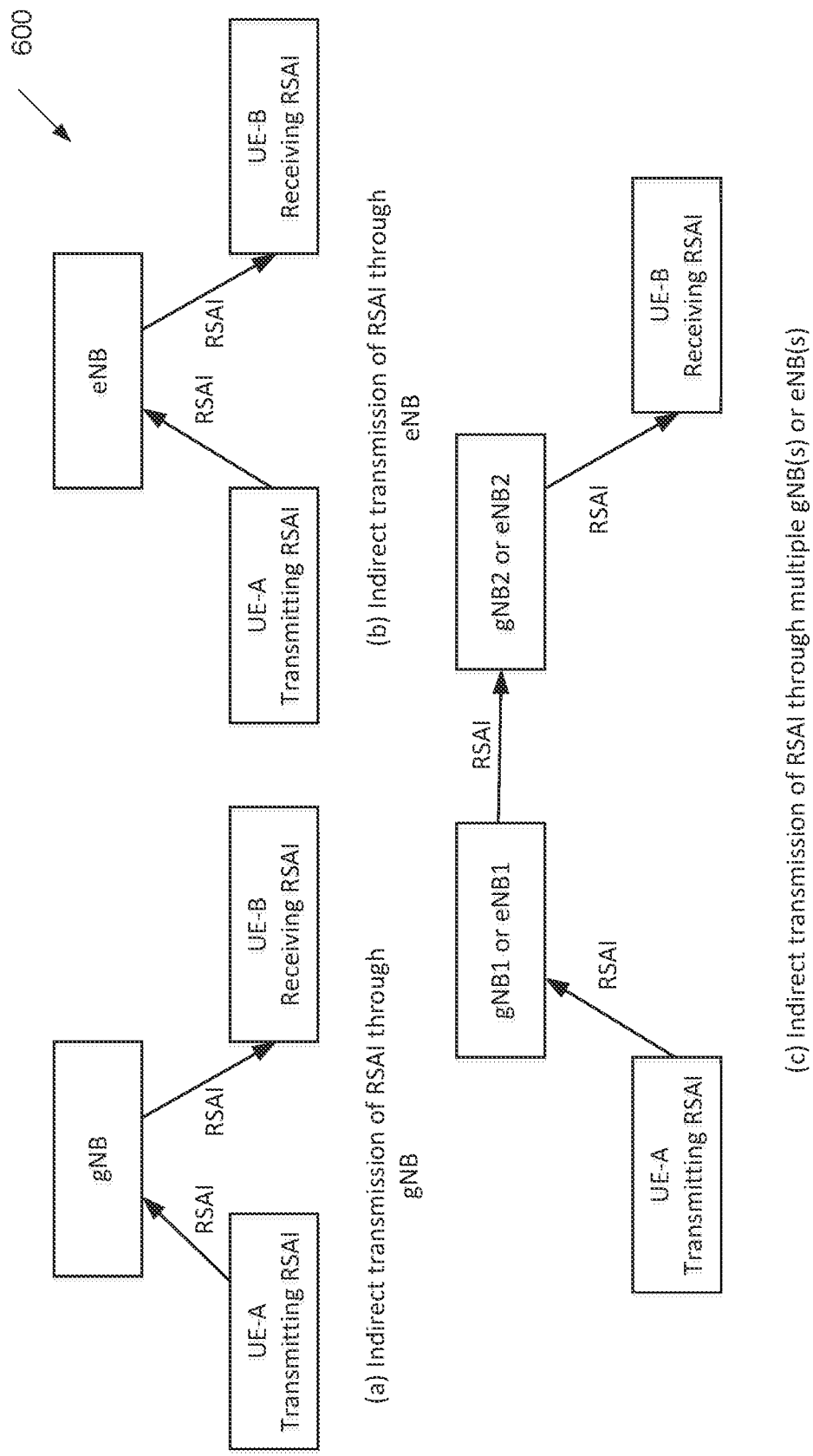
FIG. 6 illustrates example mechanism for transmission of RSAI according to various embodiments of the present disclosure.

FIG. 6 illustrates example mechanism 600 for transmission of RSAI according to various embodiments of the present disclosure. An embodiment of the mechanism 600 shown in FIG. 6 is for illustration only.

In the present disclosure, mechanisms for transmission of SL assistance information (e.g., inter-UE co-ordination information) from a gNB or an eNB to a UE are provided, wherein a SL assistance information transmission can be broadcast, groupcast or unicast to a UE-B(s).

In the present disclosure, resource selection assistance information (RSAI) or SL assistance information (e.g., inter-UE co-ordination information), can be determined based on sensing at UE-A and/or at gNB and/or at eNB. In one example, RSAI can indicate whether a SL resource is preferred or not for SL transmission.

In the present disclosure, in one example, a neighbor cell for a UE can be a cell with a physical cell identity (PCI) different from the PCI of a serving cell of the UE.

In the present disclosure, in one example, the location of a UE can be the relative location of a UE to the neighbor cell. In another example the location of a UE can be 2D location or a 3D location in a coordinate system (e.g., latitude, longitude and/or altitude).

In one embodiment, broadcast of SL information from gNB or eNB is provided.

Figure 7:
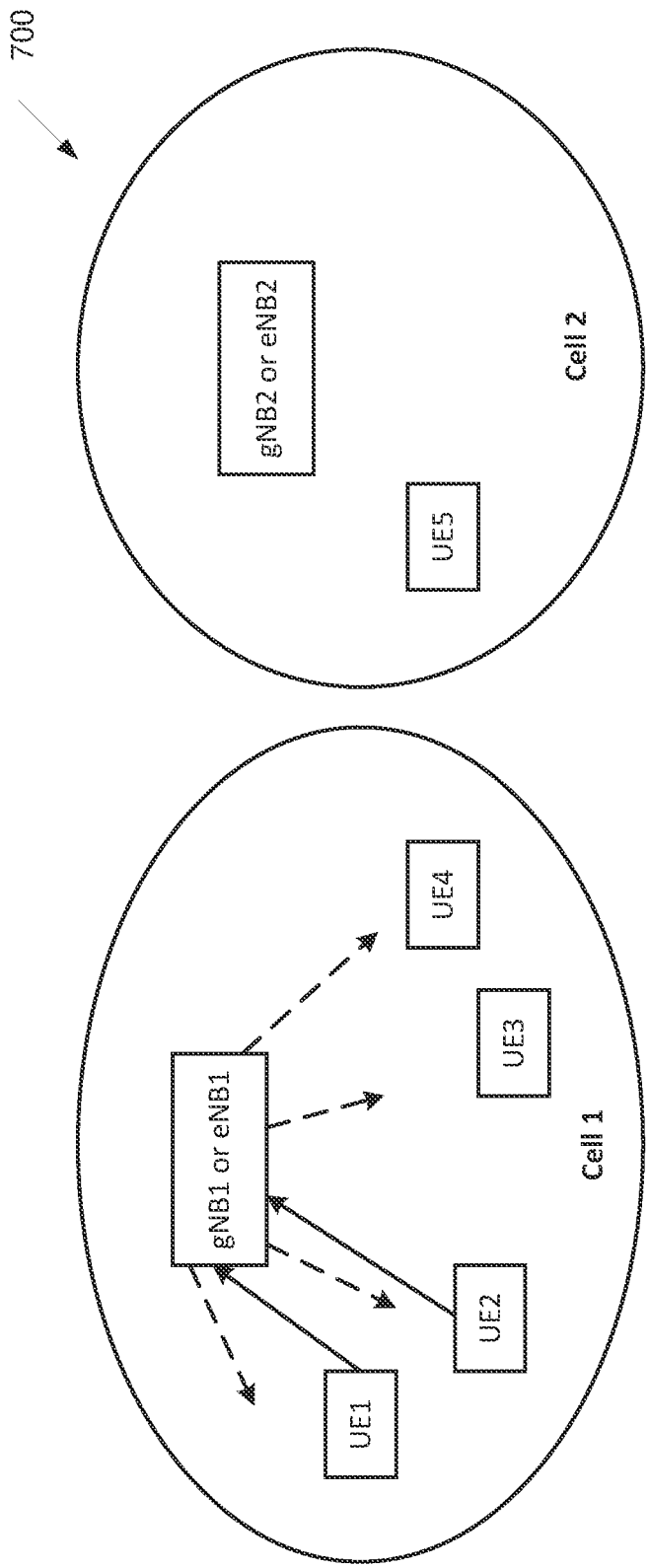
FIG. 7 illustrates example mechanism for transmission of SL assistance information, also known as inter-UE co-ordination information, according to various embodiments of the present disclosure.

FIG. 7 illustrates example mechanism 700 for transmission of SL assistance information according to various embodiments of the present disclosure. An embodiment of the mechanism 700 shown in FIG. 7 is for illustration only.

In one example 1.1, illustrated in FIG. 7, a gNB or eNB provides coverage to users in a cell.

In one example, a gNB1 or eNB1 provides coverage to SL users UE1, UE2, UE3 and UE4 in cell1.

In one example, a gNB2 or eNB2 provides coverage to SL user UE5 in cell2.

In one example, a SL user is a user capable of transmitting and/or receiving on a SL.

In one example, a subset of SL users (e.g., UE1 and UE2 in the example of FIG. 7) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

In one example, a gNB1 or eNB1 can broadcast the SL assistance information to all SL users of the cell. In the example of FIG. 7, the SL assistance information is broadcast to users UE1, UE2, UE3, and UE4.

In one example 1.1.1, a gNB or eNB broadcasts the SL assistance information the gNB or the eNB receives from each SL UE transmitting SL assistance information and/or SL assistance information generated by sensing at a gNB or eNB separately, i.e., there could be an individual message for the SL assistance information from each SL UE and/or sensing the gNB or eNB.

In another example 1.1.2, a gNB or eNB combines the SL assistance information received from all SL UEs transmitting SL assistance information and/or SL assistance information generated by sensing at the gNB or eNB, e.g., within a certain time window, and broadcasts a single message containing all such SL assistance information.

In another example 1.1.3, a gNB or eNB combines the SL assistance information received from some SL UEs transmitting SL assistance information and/or SL assistance information generated by sensing at the gNB or eNB, e.g., within a certain time window, and broadcasts a single message containing all such SL assistance information, while the remaining SL assistance information received from other SL UEs transmitting SL assistance information and/or SL assistance information generated by sensing at the gNB or eNB is transmitted separately.

In such example, UEs in another cell, for example UE5 of cell2 in FIG. 7, do not receive SL assistance information from a gNB1 or eNB1 of cell1.

Figure 8:
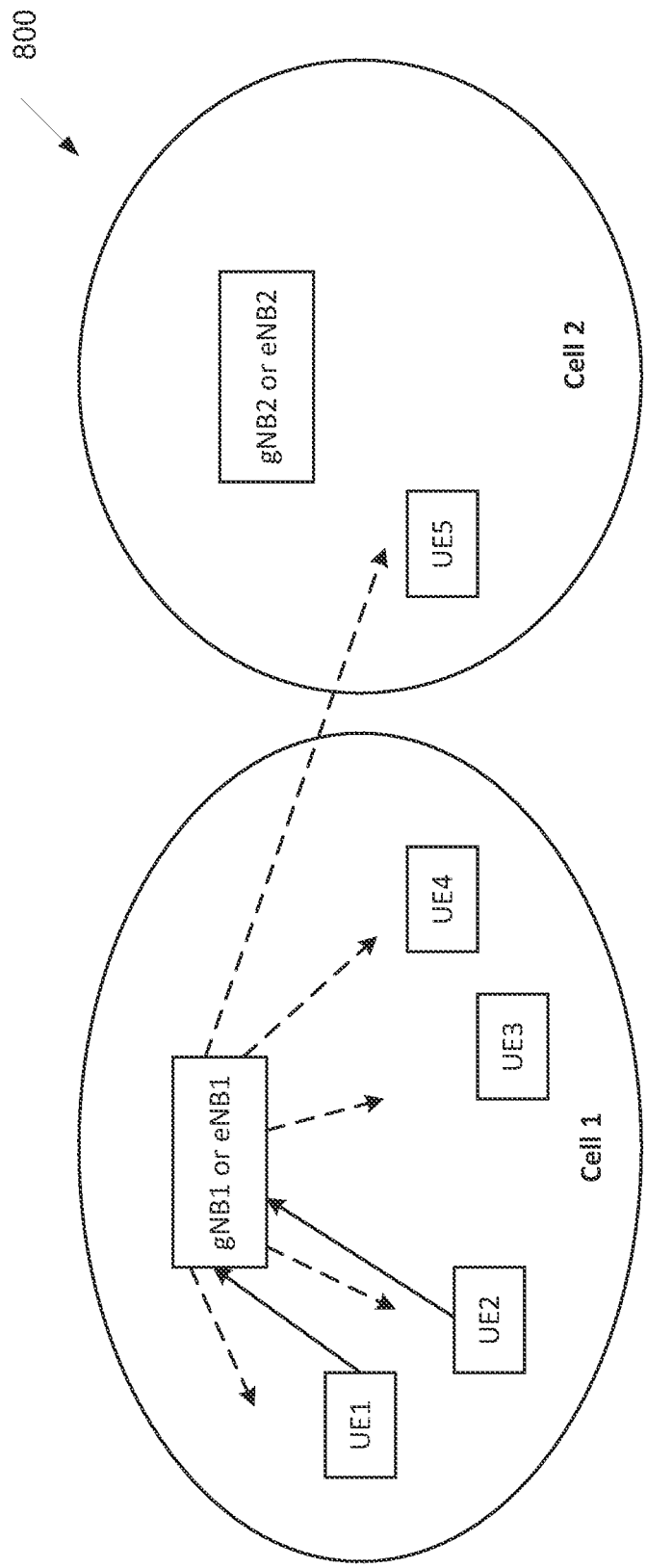
FIG. 8 illustrates another example mechanism for transmission of SL assistance information, also known as inter-UE co-ordination information, according to various embodiments of the present disclosure.

In another example 1.2, illustrated in FIG. 8, a gNB or eNB provides coverage to users in a cell.

In one example, a gNB1 or eNB1 provides coverage to SL users UE1, UE2, UE3 and UE4 in cell1.

In one example, a gNB2 or eNB2 provides coverage to SL user UE5 in cell2.

In one example, a SL user is a user capable of transmitting and/or receiving on a SL.

In one example, a subset of SL users (e.g., a UE1 and a UE2 in the example of FIG. 8) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

In one example, a gNB1 or eNB1 can broadcast the SL assistance information to all SL users of the cell and users in adjacent cell(s). In the example of FIG. 8, the SL assistance information is broadcast to users UE1, UE2, UE3 and UE4 of cell1 and user 5 of cell 2.

FIG. 8 illustrates another example mechanism 800 for transmission of SL assistance information according to various embodiments of the present disclosure. An embodiment of the mechanism 800 shown in FIG. 8 is for illustration only.

In one example 1.2.1, a gNB or eNB broadcasts the SL assistance information the gNB or the eNB receives from each SL UE transmitting SL assistance information and/or SL assistance information generated by sensing at the gNB or eNB separately, i.e., there could be an individual message for the SL assistance information from each SL UE and/or sensing the gNB or eNB.

In another example 1.2.2, a gNB or eNB combines the SL assistance information received from all SL UEs transmitting SL assistance information and/or SL assistance information generated by sensing at the gNB or eNB, e.g., within a certain time window, and broadcasts a single message containing all such SL assistance information.

In another example 1.2.3, a gNB or eNB combines the SL assistance information received from some SL UEs transmitting SL assistance information and/or SL assistance information generated by sensing at the gNB or eNB, e.g., within a certain time window, and broadcasts a single message containing all such SL assistance information, while the remaining SL assistance information received from other SL UEs transmitting SL assistance information and/or SL assistance information generated by sensing at the gNB or eNB is transmitted separately.

In one example, UEs in another cell (e.g., not cell1), for example UE5 of cell2 in FIG. 8, can receive SL assistance information from a gNB1 or eNB1 of cell1.

In one example 1.2.4, a UE in another cell (e.g., a UE5 of cell2 in FIG. 8) decides whether or not to receive the SL assistance information from a neighboring cell (e.g., cell1 in FIG. 8—cell1 is a neighbor cell for the UE5 as the serving cell of the UE5 is cell2), based on the SS-PBCH Block (SSB)-reference signal receive power (RSRP), and a threshold X. Wherein, the threshold can be configured or updated by higher layer signaling e.g., RRC signaling and/or MAC CE signaling. For example, the UE receives the SL assistance information of neighbor cell Y, if $SSB\_RSRP(Y) > X$ (or $SSB\_RSRP(Y) \geq X$), where $SSB\_RSRP(Y)$ is the SSB RSRP of cell Y.

In one example 1.2.5, a UE in another cell (e.g., a UE5 of cell2 in FIG. 8) is configured whether or not to receive the SL assistance information from a neighboring cell (e.g., cell1 in FIG. 8—cell1 is a neighbor cell for the UE5 as the serving cell of the UE5 is cell2). Wherein, the configuration and re-configuration can be by higher layer signaling e.g., RRC signaling and/or MAC CE signaling and/or by L1 control signaling.

In one example 1.2.6, a UE in another cell (e.g., a UE5 of cell2 in FIG. 8) decides whether or not to receive the SL assistance information from a neighboring cell (e.g., cell1 in FIG. 8—cell1 is a neighbor cell for the UE5 as the serving cell of the UE5 is cell2), based on the position of the UE relative to a neighboring cell, and a threshold distance (D). Wherein, the threshold can be configured or updated by higher layer signaling e.g., RRC signaling and/or MAC CE signaling.

In one example 1.2.6.1, a UE can determine the distance between the UE and neighboring cell, e.g., using positioning techniques.

In another example 1.2.6.2, a UE is configured a position of a neighbor cell (e.g., latitude and longitude), and a UE determines its own position and calculates the distance to the neighboring cell. The configuration of the position of the neighboring cell can be by higher layer signaling, e.g., RRC signaling and/or MAC CE signaling. For example, the UE receives the SL assistance information of neighbor cell Y, if Distance (Y)<D (or Distance (Y)≤D), where Distance (Y) is the distance between the UE and neighboring cell Y.

Figure 9:
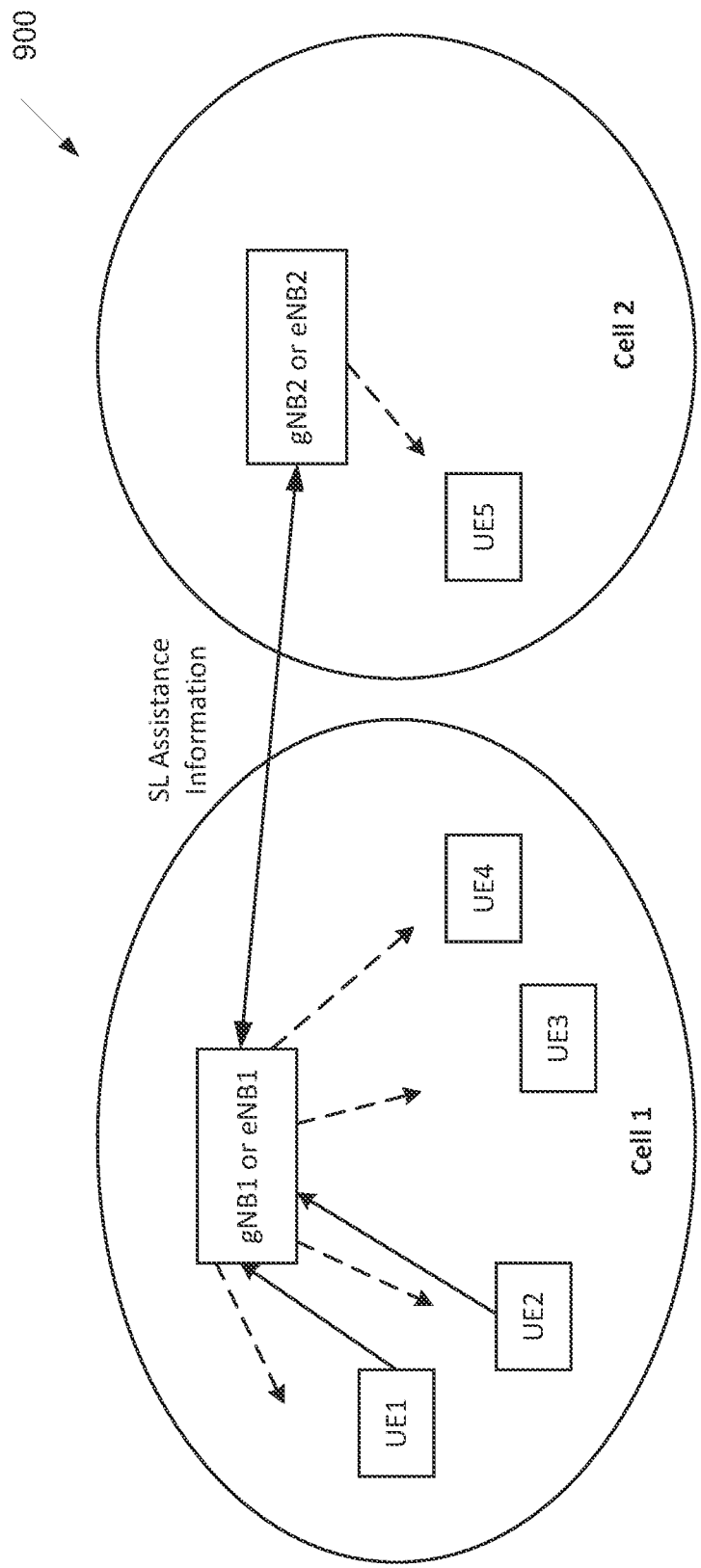
FIG. 9 illustrates yet another example mechanism for transmission of SL assistance information, also known as inter-UE co-ordination information, according to various embodiments of the present disclosure.

FIG. 9 illustrates yet another example mechanism 900 for transmission of SL assistance information according to various embodiments of the present disclosure. An embodiment of the mechanism 900 shown in FIG. 9 is for illustration only.

In one example 1.3, as illustrated in FIG. 9, a gNB or eNB provides coverage to users in a cell.

In one example, a gNB1 or eNB1 provides coverage to SL users UE1, UE2, UE3 and UE4 in cell1.

In one example, a gNB2 or eNB2 provides coverage to SL user UE5 in cell2.

In one example, a SL user is a user capable of transmitting and/or receiving on a SL.

In one example, a subset of SL users (e.g., a UE1 and a UE2 in the example of FIG. 9) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

In one example, a gNB1 or eNB1 can send the SL assistance information the gNB 1 or eNB 1 received from users in a cell and/or SL assistance information generated by sensing at the gNB1 or eNB1 to a gNB or eNB of neighboring cells (cell2 in the example of FIG. 9). Furthermore, the gNB1 or eNB1 can receive SL assistance information from a gNB or eNB of neighboring cells corresponding to SL users in those cells and/or SL assistance information generated by sensing at the gNB or eNB of those cells.

In one example, a gNB1 or eNB1 can broadcast the SL assistance information to all SL users of the cell. In the example of FIG. 9, the SL assistance information is broadcast to users UE1, UE2, UE3, and UE4. Wherein, the SL information that is broadcast by the gNB1 or eNB1 corresponds to SL information of SL users in the cell of gNB1 or eNB1 and/or SL assistance information generated by sensing at the gNB1 or eNB1, as well as SL information received from the gNB or eNB of neighboring cells.

In one example 1.3.1, a gNB or eNB broadcasts the SL assistance information the gNB or the eNB receives from each SL UE transmitting SL assistance information and/or SL assistance information generated by sensing at a gNB or eNB separately, i.e., there could be an individual message for the SL assistance information from each SL UE and/or sensing the gNB or eNB. This applies to SL assistance information from SL users in the serving cell, as well as SL assistance information from SL users of a neighboring cells and/or SL assistance information generated by sensing at a gNB or eNB.

In another example 1.3.2, a gNB or eNB combines the SL assistance information received from all SL UEs transmitting SL assistance information in the cell of the gNB or eNB and from all neighboring gNBs or eNBs and/or SL assistance information generated by sensing at the gNB or eNB, e.g., within a certain time window, and broadcasts a single message containing all such SL assistance information.

In another example 1.3.3, a gNB or eNB combines the SL assistance information received from all SL UEs transmitting SL assistance information in the cell of the gNB or eNB and/or SL assistance information generated by sensing at the gNB or eNB, e.g., within a certain time window, and broadcasts a single message containing all such SL assistance information. In addition, the gNB or eNB transmits an individual message for the SL assistance information received from each neighboring gNB or eNB.

In another example 1.3.4, a gNB or eNB combines the SL assistance information received from all SL UEs transmitting SL assistance information in the cell of the gNB or eNB and/or SL assistance information generated by sensing at the gNB or eNB, e.g., within a certain time window, and broadcasts a first message containing all such SL assistance information. In addition, the gNB or eNB combines SL assistance information from all neighboring gNBs or eNBs, e.g., within a certain time window, and broadcasts a second message containing all such SL assistance information.

In another example 1.3.5, a gNB or eNB combines the SL assistance information received from none, some or all SL UEs transmitting SL assistance information and/or SL assistance information generated by sensing at the gNB or eNB and from none, some or all neighboring gNBs or eNBs, e.g., within a certain time window, and broadcasts a single message containing all such SL assistance information, while the remaining SL assistance information received from other SL UEs transmitting SL assistance information and/or SL assistance information generated by sensing at the gNB or eNB and/or neighboring gNBs or eNBs is transmitted separately.

In one example, UEs in another cell (e.g., not cell1), for example a UE5 of cell2 in FIG. 9, receive SL assistance information from a gNB1 or eNB1 of cell1 through the gNB or eNB of that UE's serving cell (e.g., a gNB2 or eNB2 of cell2). In the example of FIG. 9, the SL assistance information of the UE1 is transmitted to the gNB1 or eNB1, which in turn forwards the SL assistance information of the UE1 to the gNB2 or eNB2 (neighboring cell), which in turn broadcasts the SL assistance information of the UE1 to the SL UE5 in the serving cell of the gNB2 or eNB2.

In one example, similarly, for UEs in a serving cell, the SL information from UEs of a neighboring cell is transmitted through the gNB or eNB of the serving cell. In the example of FIG. 9, the SL assistance information of the UE5 is transmitted to the gNB2 or eNB2, which in turn forwards the SL assistance information of the UE5 to a gNB1 or eNB1, which in turn broadcasts the SL assistance information of the UE5 to the SL UE1, UE2, UE3, and UE4 in the serving cell of the gNB1 or eNB1.

In one example 1.4, a UE can receive SL assistance information from SL UEs of a neighboring cell(s) and/or SL assistance information generated by sensing at neighboring gNB(s) or eNB(s), from the gNB or eNB of the neighboring cell(s) serving these users (as described in example 1.2) or from a serving cell gNB or eNB (as described in example 1.3). A higher layer configuration, e.g., RRC signaling and/or MAC CE signaling or L1 control indication (e.g., DCI) can determine whether a UE receives SL assistance information of UE(s) in a neighboring cell and/or SL assistance information generated by sensing at neighboring gNB(s) or eNB(s) directly from the gNB(s)/eNB(s) of the serving cell(s) of the UE(s) providing SL assistance information (as described in example 1.2) or from the gNB/eNB of the serving cell of the UE receiving SL assistance information (as described in example 1.3).

In one example 1.5, SL assistance information, e.g., inter-UE coordination information generated by sensing at a gNB, can be considered as SL assistance information generated by an additional user in a serving cell of that gNB.

In one example 1.6, SL assistance information broadcast from a gNB is associated with a DCI on a PDCCH channel with a CRC scrambled by a common RNTI for this purpose. The common RNTI can be cell-specific common RNTI.

In one example 1.7, SL assistance information is broadcast periodically every $N_{per}$ frames, i.e., with a period of 10 $N_{per}$ ms, and with a frame offset of $N_{offset}$, and with a slot offset within the frame of $S_{offset}$. SL assistance information can be transmitted in a frame that satisfies the following equation: $(SFN-N_{offset})\% N_{per}=0$, where SFN is the system frame number of the frame with SL assistance information, and % is the modulo operator, where x % N equals the remainder from the division of x by N. The slot for transmission of SL assistance information can be given by: $10 \cdot 2^{\mu} \cdot SFN+S_{offset}$. Where, μ is the sub-carrier spacing configuration. The above equation can readily use subframes instead of frames for determining the time of transmission of SL assistance information.

In one example 1.8, a UE can receive broadcast SL assistance information, when the UE has information to transmit on the SL.

In one embodiment, groupcast of SL information from gNB or eNB is provided.

A set of users in a groupcast group is configured and updated by higher layer signaling.

In one example, the configuration of UEs in a groupcast set can be based on one or more of the following: (i) the Type of UE, e.g., whether a UE has a SL receiver, or whether a UE doesn't have a SL receiver. Or whether a UE is a low energy UE (e.g., with a limited energy supply) or not; (ii) the location of a UE. UEs within a certain zone or area can be in a same groupcast set. The boundary of the zone or area can be configured or updated by higher layer signaling, e.g., RRC signaling and/or MAC CE signaling. As the UE moves, the UE can autonomously determine the groupcast set; (iii) the direction of travel of UE. UEs traveling in a certain direction can be in a same groupcast set; (iv) the motion of a UE. UEs that are stationary or moving with a low speed can be in a same groupcast set, UEs moving at a higher speed can be in another groupcast set; and (v) configuration or re-configuration by higher layer RRC signaling or MAC CE signaling or L1 control signaling, wherein a UE is configured/indicated with a groupcast ID.

In one example, a UE can be part of zero, one or more groupcast sets.

In one example, a groupcast message explicitly or implicitly indicates a groupcast set or a groupcast ID. In one instance, the resources configured for a groupcast message carrying SL assistance information implicitly indicate the groupcast set or the groupcast ID. In another instance, a groupcast specific RNTI, used to scramble the CRC of the PDCCH associated with the groupcast message carrying SL assistance information, indicates the groupcast set of the groupcast ID. In another instance, a groupcast ID is included in a groupcast message carrying SL assistance information.

Figure 10:
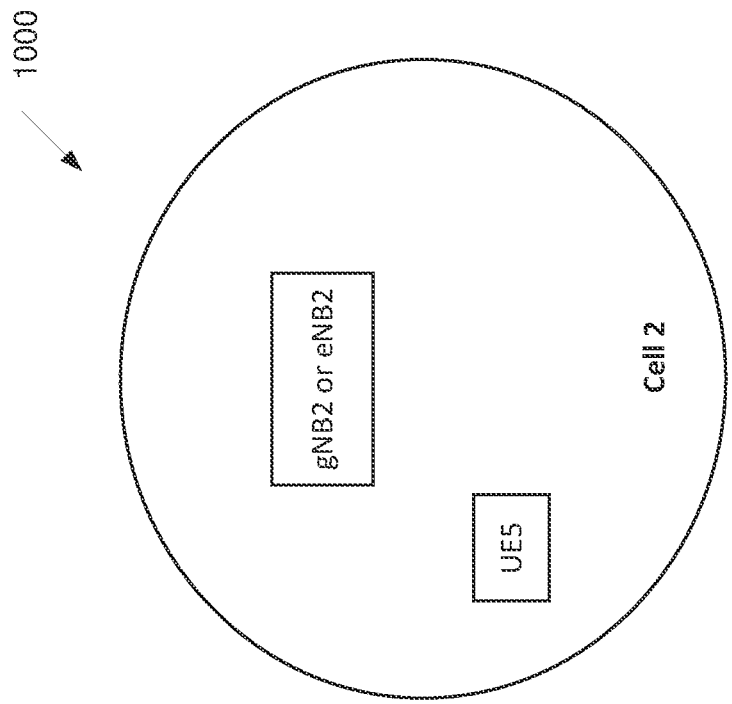
FIG. 10 illustrates yet another example mechanism for transmission of SL assistance information, also known as inter-UE co-ordination information, according to various embodiments of the present disclosure.
Figure 10:
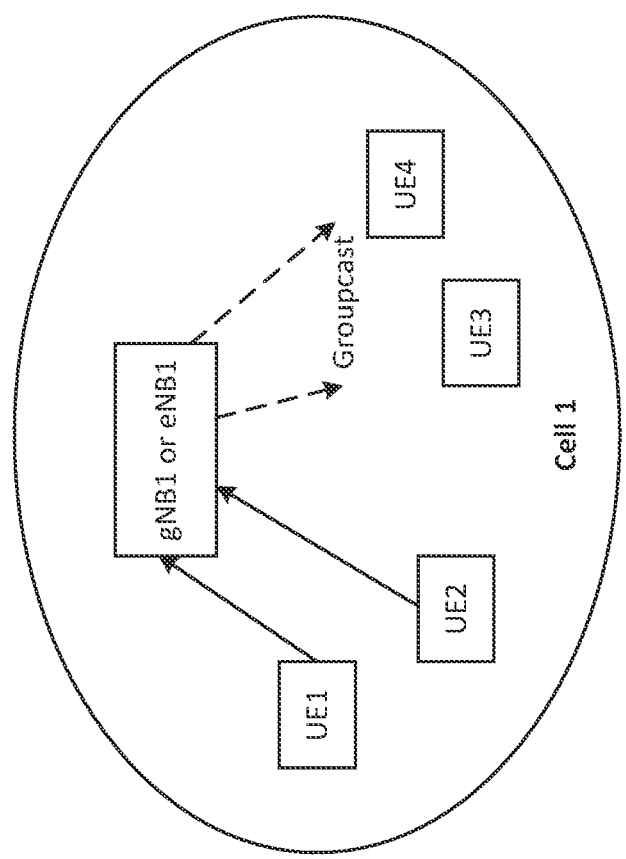

FIG. 10 illustrates yet another example mechanism 1000 for transmission of SL assistance information according to various embodiments of the present disclosure. An embodiment of the mechanism 1000 shown in FIG. 10 is for illustration only.

In one example 2.1, illustrated in FIG. 10, a gNB or eNB provides coverage to users in a cell.

In one example, a gNB1 or eNB1 provides coverage to SL users UE1, UE2, UE3 and UE4 in cell1.

In one example, a gNB2 or eNB2 provides coverage to SL user UE5 in cell2.

In one example, a SL user is a user capable of transmitting and/or receiving on a SL.

In one example, a subset of SL users (e.g., a UE1 and a UE2 in the example of FIG. 10) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

In one example, a gNB1 or eNB1 can groupcast the SL assistance information to a group of SL users of the cell, e.g., the groupcast set. In the example of FIG. 10, the SL assistance information is groupcast to users UE3 and UE4.

In one example 2.1.1, the UE transmitting the SL assistance information determines or informs the gNB or eNB of a target groupcast set. For example, the groupcast set can be determined by the L1 or L2 destination ID or by a new destination ID field in the SL assistance information. A gNB or eNB can determine target groupcast set of SL assistance information generated by the gNB or eNB's own channel sensing.

In another example 2.1.2, the gNB or eNB determines a groupcast set. For example, the groupcast set can be determined by the L1 or L2 source ID of the UE providing the SL assistance information and/or by the location of the SL UE providing the SL assistance information and/or left for the gNB or eNB implementation. The gNB or eNB can determine target groupcast set of SL assistance information generated by the gNB or the eNB's own channel sensing.

In one example 2.1.3, a gNB or eNB groupcasts the SL assistance information the gNB or the eNB receives from each SL UE transmitting SL assistance information and/or SL assistance information generated by sensing at the gNB or eNB separately, i.e., there could be an individual message for the SL assistance information from each SL UE and/or sensing gNB or eNB.

In another example 2.1.4, a gNB or eNB combines the SL assistance information received from all SL UEs transmitting SL assistance information and/or SL assistance information generated by sensing at the gNB or eNB, e.g., within a certain time window, and for a same set of groupcast UEs, and groupcasts a single message containing all such SL assistance information.

In another example 2.1.5, a gNB or eNB combines the SL assistance information received from some SL UEs transmitting SL assistance information and/or SL assistance information generated by sensing at the gNB or eNB, e.g., within a certain time window, and for a same set of groupcast UEs and groupcasts a single message containing all such SL assistance information, while the remaining SL assistance information received from other SL UEs transmitting SL assistance information and/or SL assistance information generated by sensing at the gNB or eNB is transmitted separately. UEs in another cell, for example UE5 of cell2 in FIG. 10, do not receive SL assistance information from a gNB1 or eNB1 of cell1.

Figure 11:
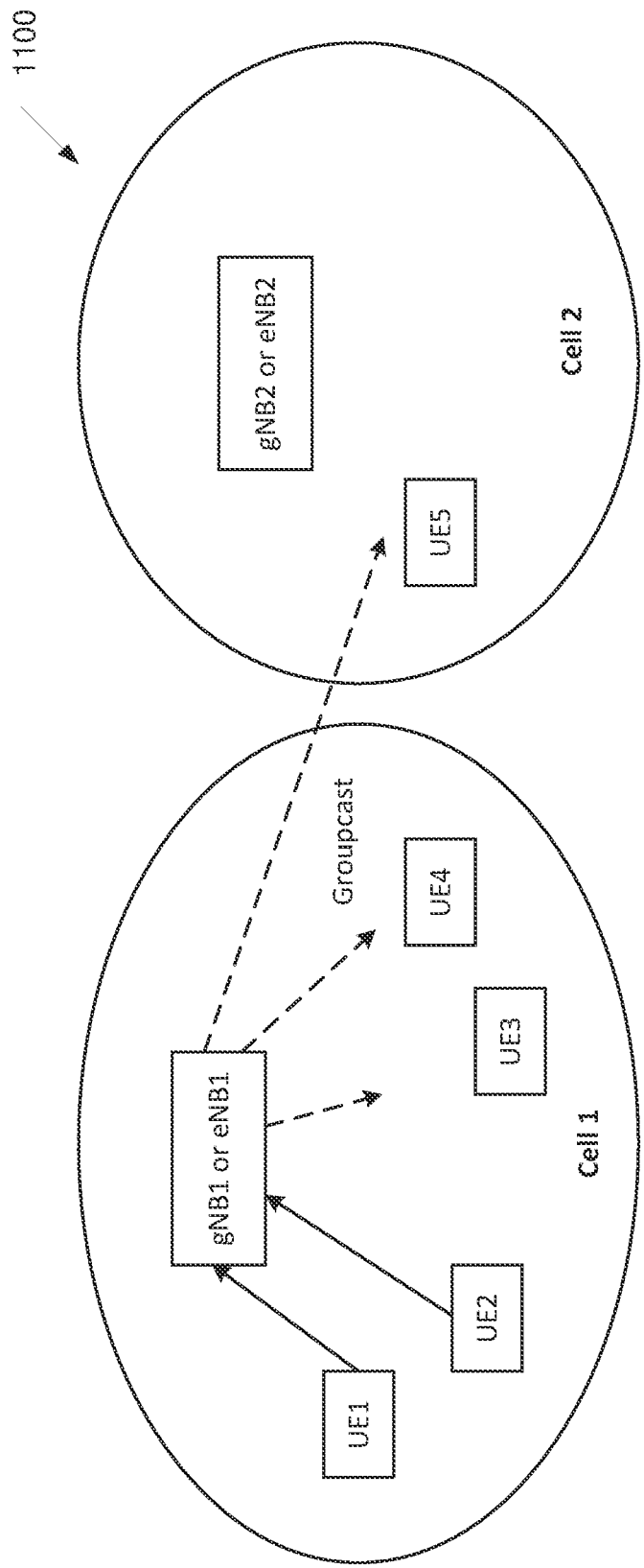
FIG. 11 illustrates yet another example mechanism for transmission of SL assistance information, also known as inter-UE co-ordination information, according to various embodiments of the present disclosure.

In another example 2.2, illustrated in FIG. 11, a gNB or eNB provides coverage to users in a cell.

In one example, a gNB1 or eNB1 provides coverage to SL users UE1, UE2, UE3, and UE4 in cell1.

In one example, a gNB2 or eNB2 provides coverage to SL user UE5 in cell2.

In one example, a SL user is a user capable of transmitting and/or receiving on a SL.

FIG. 11 illustrates yet another example mechanism 1100 for transmission of SL assistance information according to various embodiments of the present disclosure. An embodiment of the mechanism 1100 shown in FIG. 11 is for illustration only.

In one example, a subset of SL users (e.g., a UE1 and a UE2 in the example of FIG. 11) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

In one example, a gNB1 or eNB1 can groupcast the SL assistance information to a group of SL users of the cell and/or users in adjacent cell(s). In the example of FIG. 11, the SL assistance information is groupcast to users UE3 and UE4 of cell1 and user 5 of cell 2.

In one example 2.2.1, the UE transmitting the SL assistance information determines or informs the gNB or eNB of a groupcast set. For example, the groupcast set can be determined by the L1 or L2 destination ID or by a new destination ID field in the SL assistance information. The gNB or eNB can determine target groupcast set of SL assistance information generated by the gNB or the eNB's own channel sensing.

In another example 2.2.2, the gNB or eNB determines a groupcast set. For example, the groupcast set can be determined by the L1 or L2 source ID of the UE providing the SL assistance information and/or by the location of the SL UE providing the SL assistance information and/or left for the gNB or eNB implementation. The gNB or eNB can determine target groupcast set of SL assistance information generated by the gNB or the eNB's own channel sensing.

In one example 2.2.3, a gNB or eNB groupcasts the SL assistance information the gNB or the eNB receives from each SL UE transmitting SL assistance information and/or SL assistance information generated by sensing at the gNB or eNB separately, i.e., there could be an individual message for the SL assistance information from each SL UE and/or sensing gNB or eNB.

In another example 2.2.4, a gNB or eNB combines the SL assistance information received from all SL UEs transmitting SL assistance information and/or SL assistance information generated by sensing at the gNB or eNB, e.g., within a certain time window, and for a same set of groupcast UEs, and groupcasts a single message containing all such SL assistance information.

In another example 2.2.5, a gNB or eNB combines the SL assistance information received from some SL UEs transmitting SL assistance information and/or SL assistance information generated by sensing at the gNB or eNB, e.g., within a certain time window, and for a same set of groupcast UEs, and groupcasts a single message containing all such SL assistance information, while the remaining SL assistance information received from other SL UEs transmitting SL assistance information and/or SL assistance information generated by sensing at the gNB or eNB is transmitted separately.

In one example, UEs in another cell (e.g., not cell1), for example UE5 of cell2 in FIG. 11, can receive SL assistance information from a gNB1 or eNB1 of cell1. A UE is configured to be part of a groupcast set, additionally a UE may further determine whether or not to receive from a neighboring cell based on one or more of the following examples.

In one example 2.2.6, a UE in another cell (e.g., a UE5 of cell2 in FIG. 11) decides whether or not to receive the SL assistance information from a neighboring cell (e.g., cell1 in FIG. 11—cell1 is a neighbor cell for UE5 as the serving cell of UE5 is cell2), based on the SS-PBCH Block (SSB)-Reference Signal Receive Power (RSRP), and a threshold X. Wherein, the threshold can be configured or updated by higher layer signaling e.g., RRC signaling and/or MAC CE signaling. For example, the UE receives the SL assistance information of neighbor cell Y, if SSB_RSRP(Y)>X (or SSB_RSRP(Y)≥X), where SSB_RSRP(Y) is the SSB RSRP of cell Y.

In one example 2.2.7, a UE in another cell (e.g., a UE5 of cell2 in FIG. 11) is configured whether or not to receive the SL assistance information from a neighboring cell (e.g., cell1 in FIG. 11—cell1 is a neighbor cell for the UE5 as the serving cell of the UE5 is cell2). Wherein, the configuration and re-configuration can be by higher layer signaling e.g., RRC signaling and/or MAC CE signaling and/or by L1 control signaling.

In one example 2.2.8, a UE in another cell (e.g., a UE5 of cell2 in FIG. 11) decides whether or not to receive the SL assistance information from a neighboring cell (e.g., cell1 in FIG. 11—cell1 is a neighbor cell for the UE5 as the serving cell of the UE5 is cell2), based on the position of the UE relative to a neighboring cell, and a threshold distance (D). Wherein, the threshold can be configured or updated by higher layer signaling e.g., RRC signaling and/or MAC CE signaling.

In one example 2.2.8.1, a UE can determine the distance between the UE and neighboring cell, e.g., using positioning techniques.

In another example 2.2.8.2, a UE is configured a position of a neighbor cell (e.g., latitude and longitude), and a UE determines its own position and calculates the distance to the neighboring cell. The configuration of the position of the neighboring cell can be by higher layer signaling, e.g., RRC signaling and/or MAC CE signaling. For example, the UE receives the SL assistance information of neighbor cell Y, if Distance (Y)<D (or Distance (Y)≤X), where Distance (Y) is the distance between the UE and neighboring cell Y.

Figure 12:
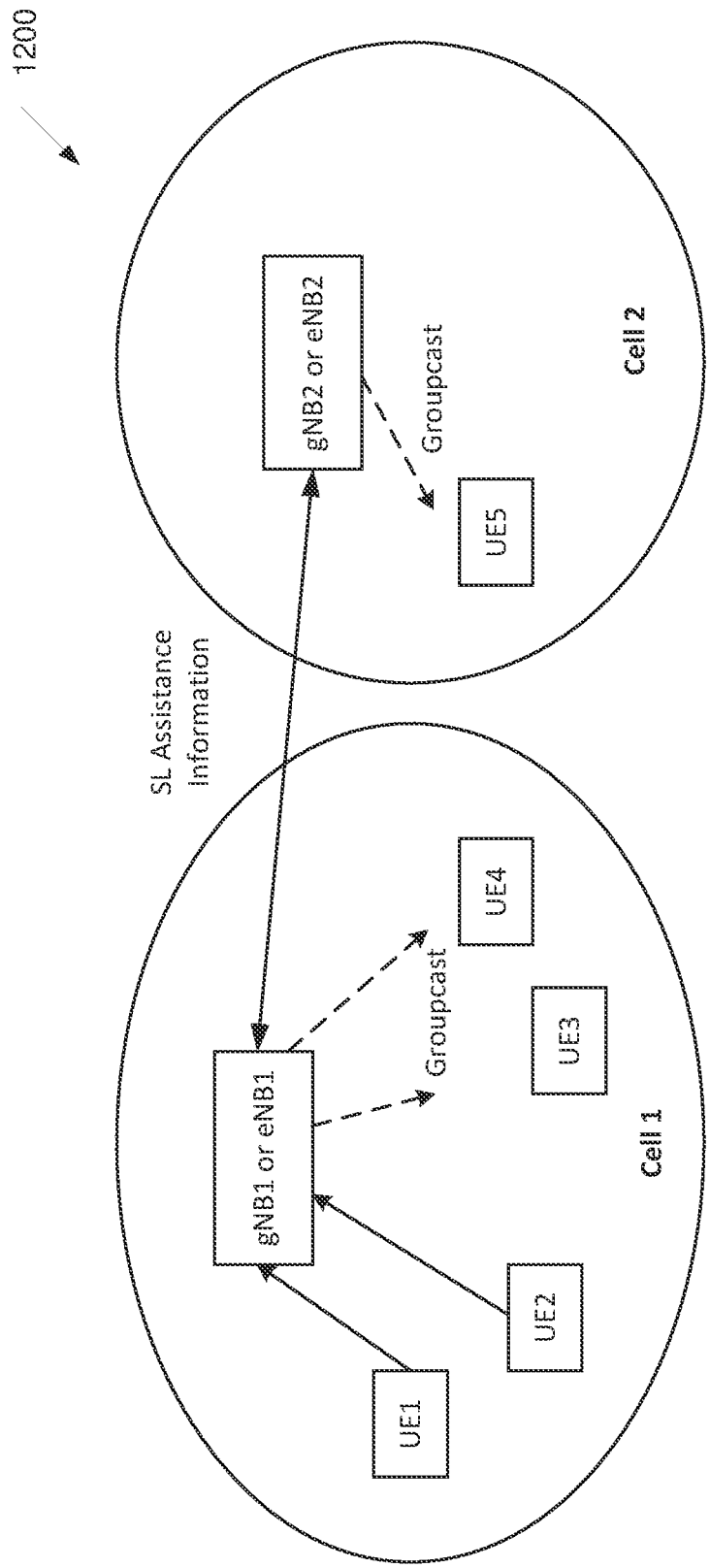
FIG. 12 illustrates yet another example mechanism for transmission of SL assistance information, also known as inter-UE co-ordination information, according to various embodiments of the present disclosure.

FIG. 12 illustrates yet another example mechanism 1200 for transmission of SL assistance information according to various embodiments of the present disclosure. An embodiment of the mechanism 1200 shown in FIG. 12 is for illustration only.

In one example 2.3, illustrated in FIG. 12, a gNB or eNB provides coverage to users in a cell.

In one example, a gNB1 or eNB1 provides coverage to SL users UE1, UE2, UE3, and UE4 in cell1.

In one example, a gNB2 or eNB2 provides coverage to SL user UE5 in cell2.

In one example, a SL user is a user capable of transmitting and/or receiving on a SL.

In one example, a subset of SL users (e.g., a UE1 and a UE2 in the example of FIG. 12) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

In one example, a gNB1 or eNB1 can send the SL assistance information the gNB or the eNB1 received from users in the gNB or the eNB's cell and/or SL assistance information generated by sensing at the gNB1 or eNB1 to a gNB or eNB of neighboring cells (cell2 in the example of FIG. 12). Furthermore, the gNB1 or eNB1 can receive SL assistance information from a gNB or eNB of neighboring cells corresponding to SL users in those cells and/or SL assistance information generated by sensing at the gNB or eNB of those cells.

In one example, a gNB1 or eNB1 can groupcast the SL assistance information to a group of SL users of the cell e.g., the groupcast set. In the example of FIG. 12, the SL assistance information is groupcast to users UE3 and UE4. Wherein, the SL assistance information that is groupcast by the gNB1 or eNB1 corresponds to SL assistance information of SL users in the cell of the gNB1 or eNB1 and/or SL assistance information generated by sensing at gNB1 or eNB1, as well as SL assistance information received from the gNB or eNB of neighboring cells.

In one example 2.3.1, the UE transmitting the SL assistance information determines the groupcast set. For example, the groupcast set can be determined by the L1 or L2 destination ID or by a new destination ID field in the SL assistance information. A gNB or eNB can determine target groupcast set of SL assistance information generated by the gNB or the eNB's own channel sensing. Routing tables can be configured in a gNB to determine whether or not the SL assistance information may be forwarded to a neighboring gNB or eNB. The routing tables can be configured or reconfigured by higher layer RRC signaling and/or MAC CE signaling. The routing tables, for example, can provide a mapping between a groupcast ID and none, one or more neighboring gNB or eNB destination ID. An example of such round table is illustrated in Table 1.

TABLE 1

Example of routing tables mapping groupcast ID to neighbor gNB or eNB ID

| Groupcast ID | Neighbor gNB or eNB ID |
|---|---|
| Groupcast ID0 | None |
| Groupcast ID1 | gNB ID0, gNB ID3 |
| Groupcast ID2 | gNB ID1 |
| Groupcast ID3 | gNB IDI, gNB ID2 |
| . . . | . . . |

In another example 2.3.2, the gNB or eNB determines the groupcast set. For example, the groupcast set can be determined by the L1 or L2 source ID of the UE providing the SL assistance information and/or by the location of the SL UE providing the SL assistance information and/or left for the gNB or eNB implementation. The gNB or eNB can determine target groupcast set of SL assistance information generated by the gNB or the eNB's own channel sensing.

In one example, a table can be mapping a location of a source UE proving SL assistance information to none, one or more neighboring gNB or eNB destination IDs. In another example, a table can be mapping a L1 or L2 source ID of a UE proving SL assistance information to none, one or more neighboring gNB or eNB destination IDs. Such mapping tables can be configured or reconfigured by higher layer RRC signaling and/or MAC CE signaling.

In one example 2.3.3, a gNB or eNB groupcasts the SL assistance information the gNB or the eNB receives from each SL UE transmitting SL assistance information and/or SL assistance information generated by sensing at a gNB or eNB separately, i.e., there could be an individual message for the SL assistance information from each SL UE and/or assistance information generated by sensing at the gNB or eNB. This applies to SL assistance information from SL users in the serving cell, as well as SL information from SL users of a neighboring cell(s) and/or SL assistance information generated by sensing at a gNB or eNB.

In another example 2.3.4, a gNB or eNB combines the SL assistance information received from all SL UEs transmitting SL assistance information in the cell of the gNB or eNB and from all neighboring gNBs or eNBs, and/or SL assistance information generated by sensing at the gNB or eNB e.g., within a certain time window, and for a same set of groupcast UEs, and groupcasts a single message containing all such SL assistance information.

In another example 2.3.5, a gNB or eNB combines the SL assistance information received from all SL UEs transmitting SL assistance information in the cell of the gNB or eNB and/or SL assistance information generated by sensing at the gNB or eNB, e.g., within a certain time window, and for a same set of groupcast UEs, and groupcasts a single message containing all such SL assistance information. In addition, the gNB or eNB transmits an individual message for the SL assistance information received from each neighboring gNB or eNB.

In another example 2.3.6, a gNB or eNB combines the SL assistance information received from all SL UEs transmitting SL assistance information in the cell of the gNB or eNB and/or SL assistance information generated by sensing at the gNB or eNB, e.g., within a certain time window, and for a same set of groupcast UEs, and groupcasts a first message containing all such SL assistance information. In addition, the gNB or eNB combines SL assistance information from all neighboring gNBs or eNBs, e.g., within a certain time window, and for a same set of groupcast UEs, and groupcasts a second message containing all such SL assistance information.

In another example 2.3.7, a gNB or eNB combines the SL assistance information received from none, some or all SL UEs transmitting SL assistance information and/or SL assistance information generated by sensing at the gNB or eNB and from none, some or all neighboring gNBs or eNBs, e.g., within a certain time window, and for a same set of groupcast UEs, and groupcasts a single message containing all such SL assistance information, while the remaining SL assistance information received from other SL UEs transmitting SL assistance information and/or SL assistance information generated by sensing at the gNB or eNB and/or neighboring gNBs or eNBs is transmitted separately.

In one example, UEs in another cell (e.g., not cell1), for example a UE5 of cell2 in FIG. 12, receive SL assistance information from a gNB1 or eNB1 of cell1 through the gNB or eNB of that UE's serving cell (e.g., a gNB2 or eNB2 of cell2) when in a corresponding groupcast set. In the example of FIG. 12, the SL assistance information of a UE1 is transmitted to the gNB1 or eNB1, which in turn forwards the SL assistance information of a UE1 to the gNB2 or eNB2 (neighboring cell) as long as there are UEs in the neighboring cell (e.g., cell2 of FIG. 12) that are part of the corresponding groupcast set, which in turn groupcasts the SL assistance information of the UE1 to a SL UE5 in the serving cell of the gNB2 or eNB2.

In one example, similarly, for UEs in a serving cell that are part of a groupcast set, the SL information from UEs of a neighboring cell is transmitted through the gNB or eNB of the serving cell. In the example of FIG. 12, the SL assistance information of the UE5 is transmitted to a gNB2 or eNB2, which in turn forwards the SL assistance information of the UE5 to a gNB1 or eNB1, as long as there are UEs in the neighboring cell (e.g., cell1 of FIG. 12) that are part of the corresponding groupcast set, which in turn groupcasts the SL assistance information of the UE5 to the SL UE3 and the UE4 in the serving cell of the gNB1 or eNB1, wherein the SL UE3 and the UE4 are included the corresponding groupcast set.

In one example 2.4, a UE can receive SL assistance information from SL UEs of a neighboring cell(s) and/or SL assistance information generated by sensing at neighboring gNB(s) or eNB(s), from the gNB or eNB of the neighboring cell serving these users (as described in example 2.2) or from a serving cell gNB or eNB (as described in example 2.3).

In one example 2.5, SL assistance information, e.g., inter-UE coordination information generated by sensing at a gNB, can be considered as SL assistance information generated by an additional user in a serving cell of that gNB.

In one example 2.6.1, SL assistance information groupcast from a gNB is associated with a DCI on a PDCCH channel with a CRC scrambled by a groupcast-specific RNTI for this purpose.

In another example 2.6.2, SL assistance information groupcast from a gNB is associated with a DCI on a PDCCH channel with a CRC scrambled by a common RNTI for this purpose. The common RNTI can be cell-specific common RNTI. Furthermore, In one example 2.6.2.1, a groupcast specific characteristic, e.g., groupcast-set specific ID is included in the groupcast message to identify the groupcast set.

In another example 2.6.2.2, a groupcast set is determined implicitly e.g., based on time and/or frequency resource and/or code (e.g., scrambling code, orthogonal code, etc.) of the groupcast message.

In one example 2.7, SL assistance information is groupcast periodically every $N_{per}$ frames, i.e., with a period of 10 $N_{per}$ ms, and with a frame offset of $N_{offset}$, and with a slot offset within the frame of $S_{offset}$. Wherein some of the parameters; $N_{per}$, $N_{offset}$ $S_{offset}$ can be groupcast-set specific, and other parameters of $N_{per}$, $N_{offset}$ $S_{offset}$ are common across all groupcast sets. SL assistance information can be transmitted in a frame that satisfies the following equation: $(SFN-N_{offset})\% N_{per}=0$, where SFN is the system frame number of the frame with SL assistance information, and % is the modulo operator, where x % N equals the remainder from the division of x by N. The slot for transmission of SL assistance information can be given by: $10 \cdot 2^{\mu} \cdot SFN + S_{offset}$. Where, $\mu$ is the sub-carrier spacing configuration. The above equation can readily use subframes instead of frames for determining the time of transmission of SL assistance information.

In one example 2.8, a UE can receive groupcast SL assistance information, when the UE has information to transmit on the SL.

In one embodiment, unicast of SL information from gNB or eNB is provided.

Figure 13:
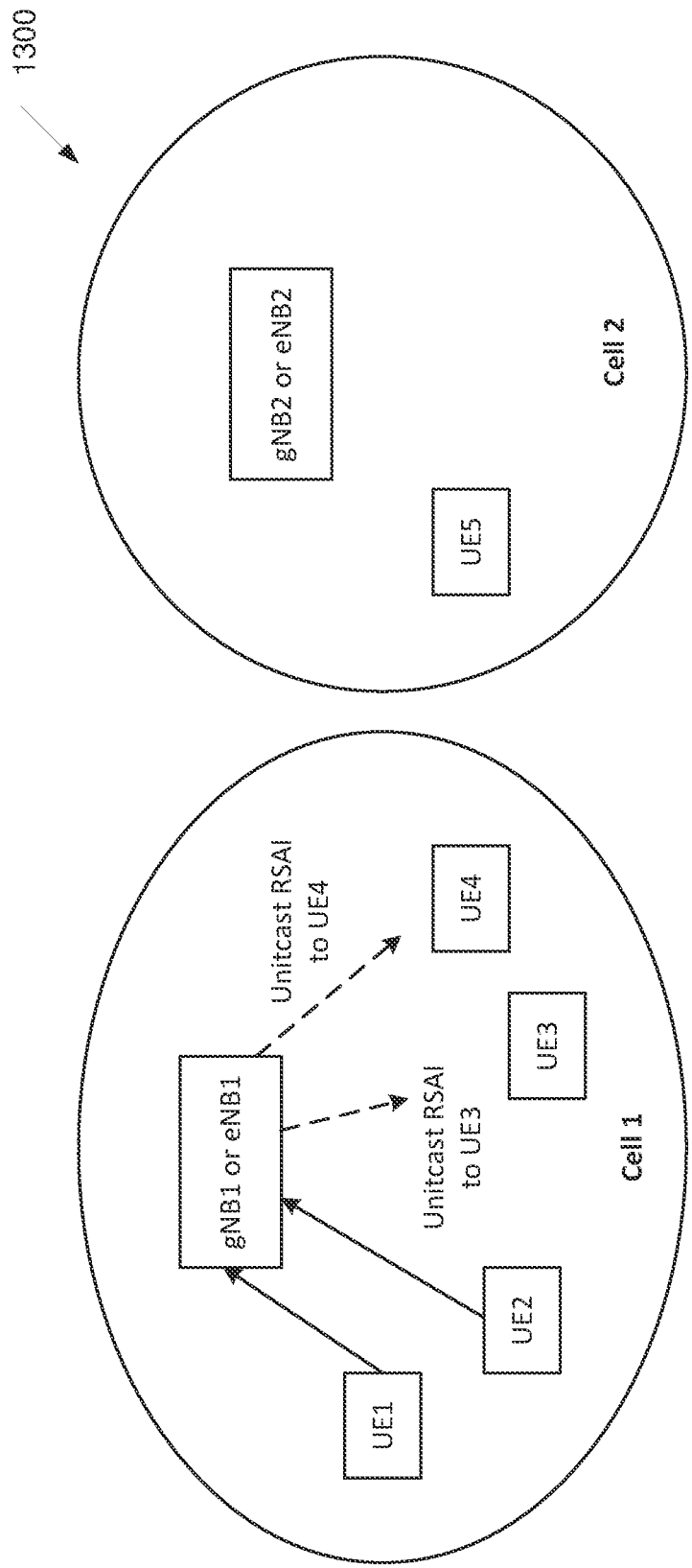
FIG. 13 illustrates yet another example mechanism for transmission of SL assistance information, also known as inter-UE co-ordination information, according to various embodiments of the present disclosure.

In one example 3.1, illustrated in FIG. 13, a gNB or eNB provides coverage to users in a cell.

In one example, a gNB1 or eNB1 provides coverage to SL users UE1, UE2, UE3, and UE4 in cell1.

In one example, a gNB2 or eNB2 provides coverage to SL user UE5 in cell2.

In one example, a SL user is a user capable of transmitting and/or receiving on a SL.

In one example, a subset of SL users (e.g., a UE1 and a UE2 in the example of FIG. 13) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

In one example, a gNB1 or eNB1 can unicast the SL assistance information to a SL user of the cell. In the example of FIG. 13, the SL assistance information is unicast individually to users UE3 and UE4.

FIG. 13 illustrates yet another example mechanism 1300 for transmission of SL assistance information according to various embodiments of the present disclosure. An embodiment of the mechanism 1300 shown in FIG. 13 is for illustration only.

In one example 3.1.1, the UE transmitting the SL assistance information determines or informs the gNB or eNB of a target SL UE. For example, the target SL UE can be determined by the L1 or L2 destination ID or by a new destination ID field in the SL assistance information. The gNB or eNB can determine a target SL UE of SL assistance information generated by the gNB or the eNB's own channel sensing.

In another example 3.1.2, the gNB or eNB determines a target SL UE. For example, the target SL UE can be determined by the L1 or L2 source ID of the UE providing the SL assistance information and/or by the location of the SL UE providing the SL assistance information and/or left for gNB or eNB implementation. The gNB or eNB can determine a target SL UE of SL assistance information generated by the gNB or the eNB's own channel sensing.

In one example 3.1.3, a gNB or eNB transmits the SL assistance information the gNB or the eNB receives from each SL UE transmitting SL assistance information and/or SL assistance information generated by sensing at the gNB or eNB separately to a SL UE receiving SL assistance information, i.e., there could be an individual message for the SL assistance information from each SL UE and/or a sensing gNB or eNB to a target SL UE.

In another example 3.1.4, a gNB or eNB combines the SL assistance information received from all SL UEs transmitting SL assistance information and/or SL assistance information generated by sensing at the gNB or eNB, e.g., within a certain time window, and for a same target SL UE, and transmits a single message containing all such SL assistance information to the target SL UE.

In another example 3.1.5, a gNB or eNB combines the SL assistance information received from some SL UEs transmitting SL assistance information and/or SL assistance information generated by sensing at the gNB or eNB, e.g., within a certain time window, and for a same target SL UE, and transmits a single message containing all such SL assistance information, while the remaining SL assistance information received from other SL UEs transmitting SL assistance information and/or SL assistance information generated by sensing at the gNB or eNB is transmitted separately to the target SL UE. UEs in another cell, for example UE5 of cell2 in FIG. 13, do not receive SL assistance information from a gNB1 or eNB1 of cell1.

Figure 14:
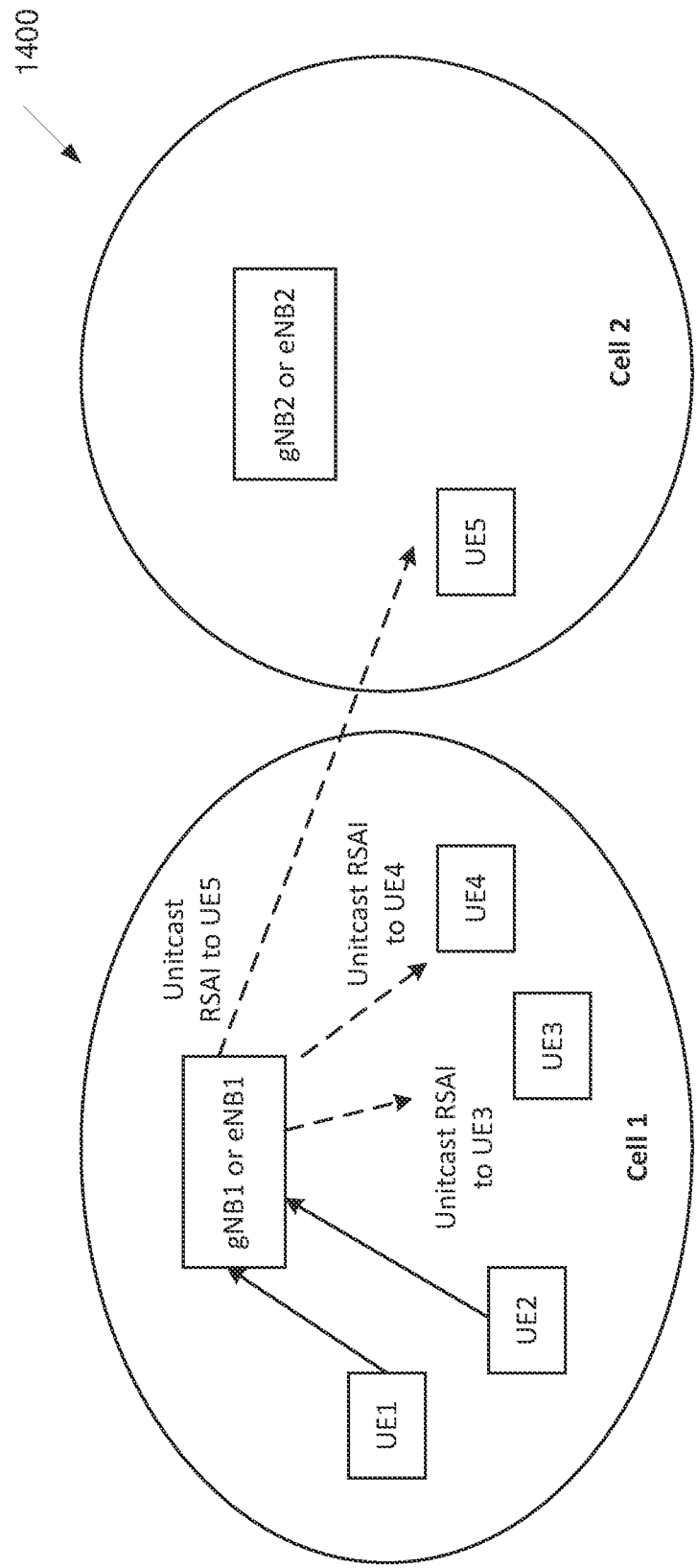
FIG. 14 illustrates yet another example mechanism for transmission of SL assistance information, also known as inter-UE co-ordination information, according to various embodiments of the present disclosure.

In another example 3.2, illustrated in FIG. 14, a gNB or eNB provides coverage to users in a cell.

In one example, a gNB1 or eNB1 provides coverage to SL users UE1, UE2, UE3, and UE4 in cell1.

In one example, a gNB2 or eNB2 provides coverage to SL user UE5 in cell2.

In one example, a SL user is a user capable of transmitting and/or receiving on a SL.

In one example, a subset of SL users (e.g., a UE1 and a UE2 in the example of FIG. 14) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

FIG. 14 illustrates yet another example mechanism 1400 for transmission of SL assistance information according to various embodiments of the present disclosure. An embodiment of the mechanism 1400 shown in FIG. 14 is for illustration only.

A gNB1 or eNB1 can unicast SL assistance information to a SL user of the cell and/or to a SL user in an adjacent cell. In the example of FIG. 14, the SL assistance information is unicast individually to users UE3 and UE4 of cell 1 and user 5 of cell 2.

In one example 3.2.1, the UE transmitting the SL assistance information determines or informs the gNB or eNB of a target SL UE. For example, the target SL UE can be determined by the L1 or L2 destination ID or by a new destination ID field in the SL assistance information. The gNB or eNB can determine the target SL UE of SL assistance information generated by the gNB or the eNB's own channel sensing.

In another example 3.2.2, the gNB or eNB determines a target SL UE. For example, the target SL UE can be determined by the L1 or L2 source ID of the UE providing the SL assistance information and/or by the location of the SL UE providing the SL assistance information and/or left for the gNB or eNB implementation. The gNB or eNB can determine a target SL UE of SL assistance information generated by the gNB or the eNB's own channel sensing.

In one example 3.2.3, a gNB or eNB transmits the SL assistance information the gNB or the eNB receives from each SL UE transmitting SL assistance information and/or SL assistance information generated by sensing at the gNB or eNB separately to a SL UE receiving SL assistance information, i.e., there could be an individual message for the SL assistance information from each SL UE and/or a sensing gNB or eNB to a target SL UE.

In another example 3.2.4, a gNB or eNB combines the SL assistance information received from all SL UEs transmitting SL assistance information and/or SL assistance information generated by sensing at the gNB or eNB, e.g., within a certain time window, and for a same target SL UE, and transmits a single message containing all such SL assistance information to the target SL UE.

In another example 3.2.5, a gNB or eNB combines the SL assistance information received from some SL UEs transmitting SL assistance information and/or SL assistance information generated by sensing at the gNB or eNB, e.g., within a certain time window, and for a same target SL UE, and transmits a single message containing all such SL assistance information, while the remaining SL assistance information received from other SL UEs transmitting SL assistance information and/or SL assistance information generated by sensing at the gNB or eNB is transmitted separately to the target SL UE.

UEs in another cell (e.g., not cell1), for example UE5 of cell2 in FIG. 14, can receive SL assistance information from a gNB1 or eNB1 of cell1. A UE may be configured to receive SL assistance information from a neighboring cell based on one or more of the following examples.

In one example 3.2.6, a UE in another cell (e.g., a UE5 of cell2 in FIG. 14) is configured to receive or not receive SL assistance information from a neighboring cell (e.g., cell1 in FIG. 14—cell1 is a neighbor cell for UE5 as the serving cell of UE5 is cell2), based on the SS-PBCH Block (SSB)-Reference Signal Receive Power (RSRP). A UE provides, to the serving gNB or eNB, SSB_RSRP measurement(s) of a neighboring cell(s). Based on SSB_RSRP measurement(s) (e.g., exceeding a threshold), a UE can be configured to receive SL assistance information transmitted from a neighboring cell(s).

In one example 3.2.7, a UE in another cell (e.g., a UE5 of cell2 in FIG. 14) is configured to receive or not receive SL assistance information from a neighboring cell (e.g., cell1 in FIG. 14—cell1 is a neighbor cell for a UE5 as the serving cell of UE5 is cell2), based on the position of the UE relative to a neighboring cell. A UE provides, to the serving gNB or eNB, the UE's position or distance (relative position) to neighboring cell(s). Based on the relative position to a neighboring cell(s), a UE can be configured to receive SL assistance information transmitted from a neighboring cell(s).

In one example 3.2.7.1, a UE can determine the distance between the UE and neighboring cell(s), e.g., using positioning techniques and provides the distance to the serving gNB or eNB.

In another example 3.2.7.2, a UE can determine its own position (e.g., latitude and longitude) and provides the UE's position to the serving gNB or eNB.

In one example 3.2.8, a UE in another cell (e.g., a UE5 of cell2 in FIG. 14) is configured whether or not to receive the SL assistance information from a neighboring cell (e.g., cell1 in FIG. 14—cell1 is a neighbor cell for a UE5 as the serving cell of the UE5 is cell2) based on network specific implementation.

Figure 15:
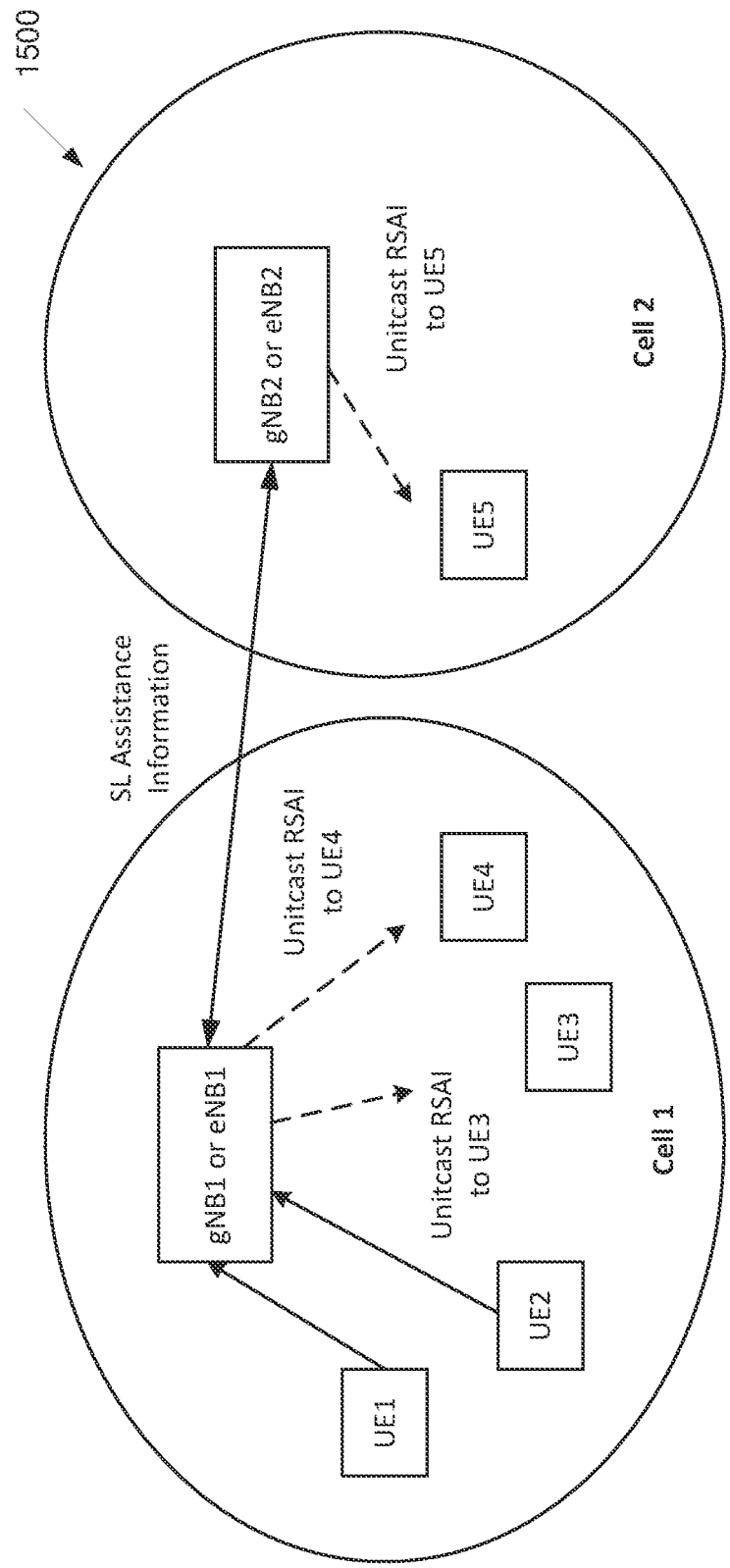
FIG. 15 illustrates yet another example mechanism for transmission of SL assistance information, also known as inter-UE co-ordination information, according to various embodiments of the present disclosure.

FIG. 15 illustrates yet another example mechanism 1500 for transmission of SL assistance information according to various embodiments of the present disclosure. An embodiment of the mechanism 1500 shown in FIG. 15 is for illustration only.

In one example 3.3, illustrated in FIG. 15, a gNB or eNB provides coverage to users in a cell.

In one example, a gNB1 or eNB1 provides coverage to SL users UE1, UE2, UE3, and UE4 in cell1.

In one example, a gNB2 or eNB2 provides coverage to SL user UE5 in cell2.

In one example, a SL user is a user capable of transmitting and/or receiving on a SL.

In one example, a subset of SL users (e.g., a UE1 and a UE2 in the example of FIG. 15) can provide SL assistance information to a gNB or eNB, e.g., inter-UE coordination information. The subset of SL users that provide SL assistance information can be none, one, some or all SL users of a cell.

In one example, a gNB or eNB can perform channel sensing to generate SL assistance information for inter-UE coordination.

In one example, SL assistance information can be based on: (i) example A: SL assistance information, e.g., inter-UE coordination information provided by SL UEs; (ii) example B: SL assistance information, e.g., inter-UE coordination information provided by the gNB's or eNB's own channel sensing; and (iii) example C: a combination of example A and example B, i.e., Sidelink assistance information, e.g., inter-UE coordination information provided by SL UEs and provided by the gNB's or eNB's own channel sensing.

A gNB1 or eNB1 can send the SL assistance information the gNB or the eNB 1's received from users in the gNB or the eNB 1's cell and/or SL assistance information generated by sensing at the gNB1 or eNB1 to a gNB or eNB of neighboring cells (cell2 in the example of FIG. 15). Furthermore, the gNB1 or eNB1 can receive SL assistance information from a gNB or eNB of neighboring cells corresponding to SL users in those cells and/or SL assistance information generated by sensing at the gNB or eNB of those cells.

A gNB1 or eNB1 can unicast the SL assistance information to a SL user of the cell. In the example of FIG. 15, the SL assistance information is unicast individually to users UE3 and UE4. Wherein, the SL information that is unicast by the gNB1 or eNB1 corresponds to SL information of SL users in the cell of the gNB1 or eNB1 and/or SL assistance information generated by sensing at the gNB1 or eNB1, as well as SL information received from the gNB or eNB of neighboring cells.

In one example 3.3.1, the UE transmitting the SL assistance information determines or informs the gNB or eNB of a target SL UE. For example, the target SL UE set can be determined by the L1 or L2 destination ID or by a new destination ID field in the SL assistance information. The gNB or eNB can determine target sensing area of SL assistance information generated by the gNB or the eNB's own channel sensing. Routing tables can be configured in a gNB to determine whether or not the SL assistance information may be forwarded to a neighboring gNB or eNB. The routing tables can be configured or reconfigured by higher layer RRC signaling and/or MAC CE signaling. The routing tables, for example, can provide a mapping between a UE ID and none, one or more neighboring gNB or eNB destination ID. An example of such round table is illustrated in TABLE 2.

TABLE 2

Example of routing tables mapping target SL UE ID to neighbor gNB or eNB ID

| UE ID | Neighbor gNB or eNB ID |
|---|---|
| Target SL UE ID0 | None |
| Target SL UE ID1 | gNB ID0, gNB ID3 |
| Target SL UE ID2 | gNB ID1 |
| Target SL UE ID3 | gNB IDI, gNB ID2 |
| . . . | . . . |

In another example 3.3.2, the gNB or eNB determines a target SL UE. For example, the target SL UE can be determined by the L1 or L2 source ID of the UE providing the SL assistance information and/or by the location of the SL UE providing the SL assistance information and/or left for the gNB or eNB implementation. The gNB or eNB can determine target sensing area of SL assistance information generated by the gNB or the eNB's own channel sensing.

In one example, a table can be mapping a location of a source UE proving SL assistance information to none, one or more neighboring gNB or eNB destination IDs. In another example, a table can be mapping a L1 or L2 source ID of a UE proving SL assistance information to none, one or more neighboring gNB or eNB destination IDs. Such mapping tables can be configured or reconfigured by higher layer RRC signaling and/or MAC CE signaling.

In one example 3.3.3, a gNB or eNB transmits the SL assistance information the gNB or the eNB receives from each SL UE transmitting SL assistance information and/or SL assistance information generated by sensing at a gNB or eNB separately to a SL UE receiving SL assistance information, i.e., there could be an individual message for the SL assistance information from each SL UE and/or assistance information generated by sensing at the gNB or eNB to a target SL UE. This applies to SL information from SL users in the serving cell, as well as SL information from SL users of a neighboring cell(s) and/or SL assistance information generated by sensing at a gNB or eNB.

In another example 3.3.4, a gNB or eNB combines the SL assistance information received from all SL UEs transmitting SL assistance information in the cell of the gNB or eNB and from all neighboring gNBs or eNBs, and/or SL assistance information generated by sensing at the gNB or eNB e.g., within a certain time window, and for a same target SL UE, and transmits a single message containing all such SL assistance information to the target SL UE.

In another example 3.3.5, a gNB or eNB combines the SL assistance information received from all SL UEs transmitting SL assistance information in the cell of the gNB or eNB and/or SL assistance information generated by sensing at the gNB or eNB, e.g., within a certain time window, and for a same target SL UE, and transmits a single message containing all such SL assistance information. In addition, the gNB or eNB transmits an individual message for the SL information received from each neighboring gNB or eNB for each target SL UE.

In another example 3.3.6, a gNB or eNB combines the SL assistance information received from all SL UEs transmitting SL assistance information in the cell of the gNB or eNB and/or SL assistance information generated by sensing at the gNB or eNB, e.g., within a certain time window, and for a same target SL UE, and transmits a first message containing all such SL assistance information to the target SL UE. In addition, the gNB or eNB combines SL assistance information from all neighboring gNBs or eNBs, e.g., within a certain time window, and for a same target SL UE, and transmits a second message containing all such SL assistance information to the target SL UE.

In another example 3.3.7, a gNB or eNB combines the SL assistance information received from none, some or all SL UEs transmitting SL assistance information and/or SL assistance information generated by sensing at the gNB or eNB and from none, some or all neighboring gNBs or eNBs, e.g., within a certain time window, and for a same target SL UE, and transmits a single message containing all such SL assistance information, while the remaining SL assistance information received from other SL UEs transmitting SL assistance information and/or SL assistance information generated by sensing at the gNB or eNB and/or neighboring gNBs or eNBs is transmitted separately.

UEs in another cell (e.g., not cell1), for example UE5 of cell2 in FIG. 15, receive SL assistance information from a gNB1 or eNB1 of cell1 through the gNB or eNB of that UE's serving cell (e.g., a gNB2 or eNB2 of cell2). In the example of FIG. 15, the SL assistance information of a UE1 destined to a UE5, is transmitted to the gNB1 or eNB1, which in turn forwards the SL assistance information of the UE1 to gNB2 or eNB2 (neighboring cell), which in turn transmits the SL assistance information of the UE1 to a SL UE5 in the serving cell of the gNB2 or eNB2.

Similarly, for UEs in a serving cell, the SL information from UEs of a neighboring cell is transmitted through the gNB or eNB of the serving cell. In the example of FIG. 15, the SL assistance information of a UE5 destined to a UE in cell1 (e.g., a UE3 or a UE4) is transmitted to the gNB2 or eNB2, which in turn forwards the SL assistance information of the UE5 to the gNB1 or eNB1, which in turn transmits the SL assistance information of the UE5 to a SL UE3 or a UE4 in the serving cell of the gNB1 or eNB1.

In one example 3.4, a UE can receive SL assistance information from SL UEs of a neighboring cell(s) and/or SL assistance information generated by sensing at neighboring gNB(s) or eNB(s), from the gNB or eNB of the neighboring cell serving these users (as described in example 3.2) or from a serving cell gNB or eNB (as described in example 3.3).

In one example 3.4A, SL assistance information, e.g., inter-UE coordination information generated by sensing at gNB, can be considered as SL assistance information generated by an additional user in a serving cell of that gNB.

In one example 3.4B.1, SL assistance information unicast from a gNB is associated with a DCI on a PDCCH channel with a CRC scrambled by a UE-specific RNTI for this purpose.

In another example 3.4B.2, SL assistance information unicast from a gNB is associated with a DCI on a PDCCH channel with a CRC scrambled by a UE-specific RNTI e.g., C-RNTI, i.e., a UE receiving unicast SL assistance information can be in connected mode with a C-RNTI.

In another example 3.4B.3, SL assistance information unicast from a gNB is associated with a DCI on a PDCCH channel with a CRC scrambled by a common RNTI for this purpose. The common RNTI can be cell-specific common RNTI. Furthermore, In one example 3.4B.3.1, a UE specific characteristic, e.g., UE-specific ID is included in the unicast message to identify the UE.

In another example 3.4B.3.2, a UE is determined implicitly e.g., based on time and/or frequency resource and/or code (e.g., scrambling code, orthogonal code, etc.) of the unicast message.

In one example 3.4C, SL assistance information is transmitted periodically every $N_{per}$ frames, i.e., with a period of $10\,N_{per}$ ms, and with a frame offset of $N_{offset}$, and with a slot offset within the frame of $S_{offset}$. Wherein some of the parameters; $N_{per}$, $N_{offset}$ $S_{offset}$ can be UE $N_{per}$, $N_{offset}$ $S_{offset}$ specific, and other parameters of $N_{per}$, $N_{offset}$ $S_{offset}$ are common across all UEs or sets of UEs. SL assistance information can be transmitted in a frame that satisfies the following equation: $(SFN-N_{offset})\% N_{per}=0$, where SFN is the system frame number of the frame with SL assistance information, and % is the modulo operator, where x % N equals the remainder from the division of x by N. The slot for transmission of SL assistance information can be given by: $10 \cdot 2^{\mu} \cdot SFN + S_{offset}$. Where, $\mu$ is the sub-carrier spacing configuration. The above equation can readily use subframes instead of frames for determining the time of transmission of SL assistance information.

In one example 3.4D, a UE can request and/or receive unicast SL assistance information, when the UE has information to transmit on the SL.

In one example 3.4E, a UE can trigger RRC connection setup or establishment when the UE has SL information to transmit and is requesting SL assistance information, e.g., inter-UE coordination through a gNB or eNB.

In one example 3.4F, SL assistance information request, e.g., inter-UE coordination request sent by a UE may include the serving cell information of the UE (e.g., physical cell Identifier—PCI) and C-RNTI.

In one example 3.4F, SL assistance information request, e.g., inter-UE coordination request sent by a UE may include the serving cell information of a UE (e.g., physical cell Identifier—PCI) and C-RNTI from which inter-UE coordination information is requested.

In the following examples, a UE-A sends to a UE-B SL assistance information (e.g., "A set of resources").

In one example 3.5, a UE-B sends a request to a gNB or eNB of a serving cell requesting resource selection assistance information. This is illustrated in FIG. 16.

In one example 3.5.1, a request from SL assistance information may include a UE-A ID(s) for a UE-A(s) to provide SL assistance information. Wherein, a UE-ID may be a L1 or L2 source ID, L1 or L2 destination ID, a C-RNTI, or a newly defined ID. In one example, UE-A(s) is the target UE of a SL transmission from UE-B. In another example UE-A(s) are UEs in close proximity to UE-B. In one example, the request for SL assistance information includes location information about UE-B. In one example, the request for SL assistance information can include information about the motion of UE-B (e.g. speed of travel and/or direction of travel).

In another example 3.5.2, a gNB or eNB may determine a UE-A, wherein a UE-A may be determined based on: (i) measurement(s) provided by a UE-B (e.g., SL-RSRP measurement at the UE-B of other SL UEs), wherein the SL-RSRP measurement can be based on PSCCH-DMRS or PSSCH-DMRS; (ii) location information based on the location of a UE-B and a UE-A to be in proximity; and (iii) a gNB or eNB implementation.

Figure 16:
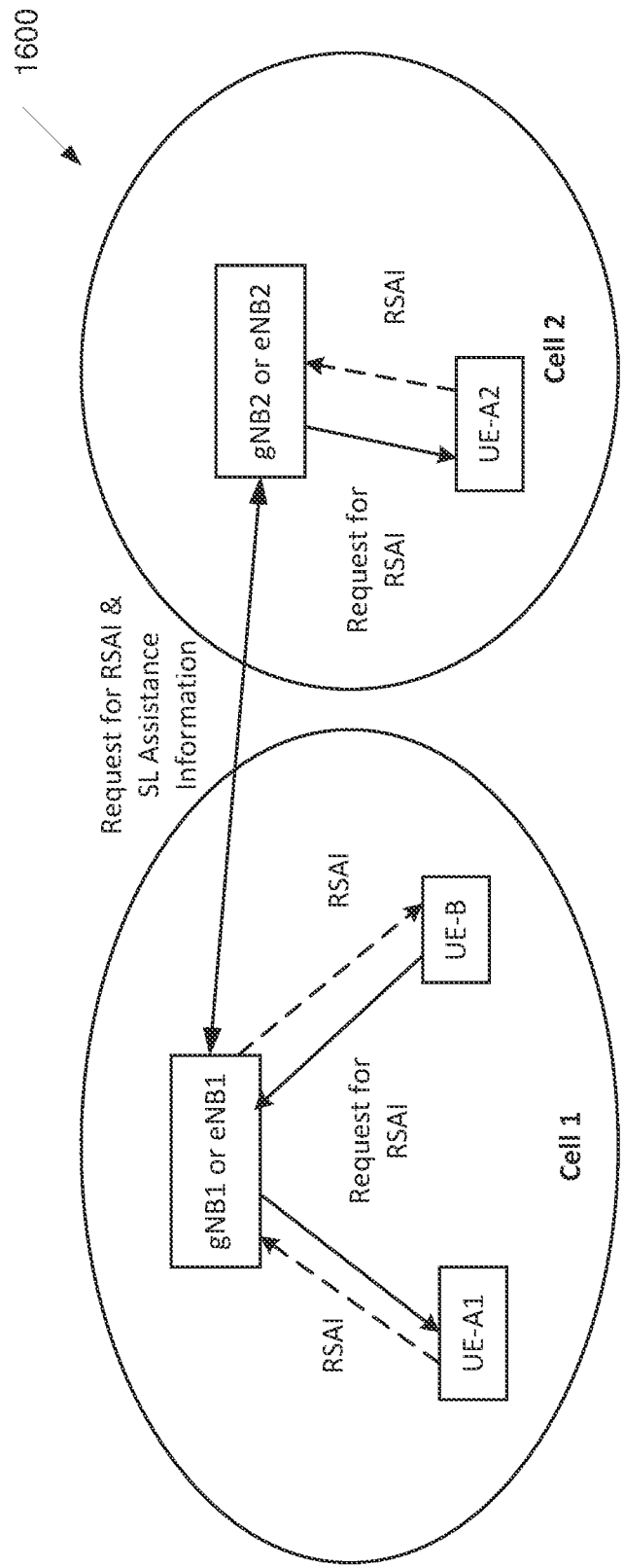
FIG. 16 illustrates yet another example mechanism for transmission of SL assistance information, also known as inter-UE co-ordination information, according to various embodiments of the present disclosure.

In one example 3.5.2.1, a gNB or eNB determining a UE-A is the gNB or eNB of the serving cell of a UE-B. e.g., gNB1 for UE-A1 in FIG. 16.

In another example 3.5.2.2, a gNB or eNB determining a UE-A is the gNB or eNB of the serving cell of a UE-A. e.g., gNB2 for UE-A2 in FIG. 16.

In one example 3.5.2.3, a UE-A and a UE-B are in a same serving cell. e.g., UE-A1 and UE-B in FIG. 16.

In another example 3.5.2.4, a UE-A and a UE-B are in different serving cells (i.e., cells with different PCIs). e.g., UE-A2 and UE-B in FIG. 16.

In another example 3.5.2.5, some UE-A(s) and a UE-B are in a same serving cell, and other UE-A(s) and the UE-B are in a different serving cells as illustrated in FIG. 16.

In another example 3.5.3, a UE-A is determined based on a combination of example 3.5.1 and 3.5.2. For example, a UE-B determines a set of UE-A IDs, a serving gNB or eNB of the cell of a UE-B further refines the set of a UE-A IDs, a serving gNB or eNB of a UE-A further refines the set of UE-A IDs.

In one example 3.5.2.1, a UE-A and a UE-B are in a same serving cell.

In another example 3.5.2.2, a UE-A and a UE-B are in different serving cells.

In another example 3.5.2.3, some UE-A(s) and a UE-B are in a same serving cell, and other UE-A(s) and the UE-B are in a different serving cells.

FIG. 16 illustrates yet another example mechanism 1600 for transmission of SL assistance information according to various embodiments of the present disclosure. An embodiment of the mechanism 1600 shown in FIG. 16 is for illustration only.

In FIG. 16, UE-A1 and UE-B have gNB1 as the gNB of their serving cell, and UE-A2 has gNB2 as the gNB of its serving cell. UE-B sends a request for RSAI to gNB1. In one example, the RSAI request from UE-B includes the ID(s) of the UEs to provide RSAI, e.g., UE-A1 and UE-A2. In another example, gNB1 determines the ID(s) of the UEs to provide RSAI, e.g., UE-A1 and UE-A2. In this example, UE-A1 is in the same serving cell as UE-B, and UE-A2 is in a different serving cell from that of UE-B. gNB1, sends a request for RSAI to UE-A1, and a request for RSAI to gNB2 (for UE-A2). gNB2 sends a request for RSAI to UE-A2. UE-A1 determines, the RSAI. In one example, UE-A1 sends the RSAI directly to UE-B (not shown in FIG. 16). In another example, as shown in FIG. 16, UE-A1 sends the RSAI to gNB1 and the gNB1 sends the RSAI (possibly after aggregating with the RSAI of UE-A2) to UE-B. UE-A2 determines, the RSAI. In one example, UE-A2 sends the RSAI directly to UE-B (not shown in FIG. 16). In another example, UE-A2 sends the RSAI to gNB2 and the gNB2 sends the RSAI directly to UE-B (not shown in FIG. 16). In another example, as shown in FIG. 16, UE-A2 sends the RSAI to gNB2 and the gNB2 sends the RSAI to gNB1 and the gNB1 sends the RSAI (possibly after aggregating with the RSAI of UE-A1) to UE-B. UE-B uses the RSAI for determining candidate SL resources for SL transmission and selects SL resources from the determined candidate SL resources.

Figure 17:
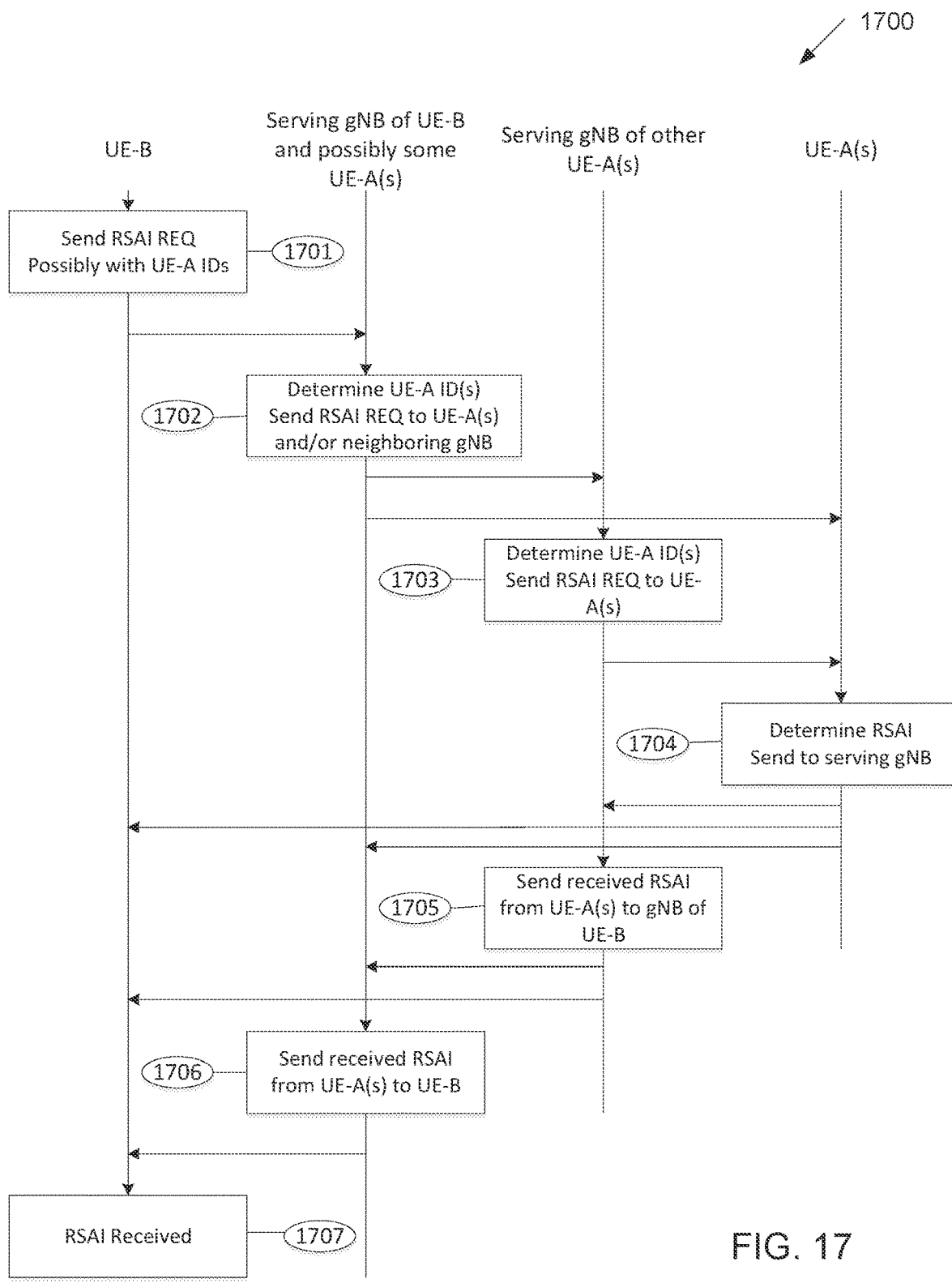
FIG. 17 illustrates example signaling flow for transmission of SL assistance information transmission, also known as inter-UE co-ordination information, according to various embodiments of the present disclosure.

FIG. 17 illustrates example signaling flow 1700 for transmission of SL assistance information transmission according to various embodiments of the present disclosure. The signaling flow 1700 as may be performed by UEs (e.g., 111-116 as illustrated in FIG. 1) and base stations (e.g., BSs 101-103 as illustrated in FIG. 1). An embodiment of the signaling flow 1700 shown in FIG. 17 is for illustration only.

As illustrated in FIG. 17, in step 1701, a UE-B sends a request for SL assistance information (RSAI REQ) to a gNB or eNB of serving cell. The RSAI REQ may include UE-A ID(s) requested to provide SL assistance information.

In step 1702, the gNB or eNB of the serving cell of a UE-B can determine a UE-A ID(s) based on RSAI REQ from the UE-B: a gNB or eNB of the serving cell of a UE-B can send a SL assistance information request to a UE-A(s) whose serving cell is that of gNB or eNB; and/or a gNB or eNB of the serving cell of the UE-B can send a SL assistance information request to gNBs or eNBs of neighboring cells; and/or a gNB or eNB can perform channel sensing for determining SL assistance information, i.e., inter-UE coordination information to send to the UE-B.

In step 1703, a gNB or eNB of a neighboring cell of UE-B's serving cell can determine a UE-A ID(s) based on RSAI REQ from the gNB or eNB of serving cell of a UE-B. A gNB or eNB of a neighboring cell of UE-B's serving cell can send a SL assistance information request to UE-A(s) whose serving cell is that of the gNB or eNB. A gNB or eNB of a neighboring cell can perform channel sensing for determining SL assistance information, i.e., inter-UE coordination information.

In step 1704, a UE-A receiving a SL assistance information request determines or calculates the SL assistance information. In one example, a UE-A can provide SL assistance information to the gNB or eNB of the serving cell of the UE-A, wherein the serving cell of a UE-A can be the same as the serving cell of a UE-B or the serving cell of the UE-A can be a different serving cell from that of the UE-B.

In another example, a UE-A can provide SL assistance information to the gNB or eNB of the serving cell of a UE-B, even if it is different from that of the serving cell of a UE-A. In another a UE-A can provide SL assistance information directly to a UE-B, or through a third UE (i.e., UE-C). The latter is not shown in FIG. 17.

In step 1705, a gNB or eNB of a serving cell of a UE-A, wherein the serving cell of a UE-A is different from that of a UE-B, receives the SL assistance information from a UE-A, and/or generates SL assistance information based on the UE-A's sensing, sends the SL assistance information to a gNB or eNB of a serving cell of the UE-B. Routing tables, e.g., as described in TABLE 2 can determine a target gNB or eNB for the serving cell of a UE-B. In a variant, a gNB or eNB can directly provide the SL assistance information to a UE-B (example 3.2), even though a UE-B has a different serving cell.

In step 1706, a gNB or eNB of a serving cell of UE-B, receives SL assistance information from: (i) a UE-A(s) in the serving cell; (ii) directly from a UE-A(s) not in the serving cell; and/or (iii) indirectly from a UE-A(s) not in the serving cell, through gNB(s) or eNB(s) of neighboring cells (example 3.3).

The gNB or eNB of the serving cell of a UE-B sends the SL assistance information to the UE-B.

In step 1707, the UE-B receives the SL assistance information. UE-B uses the received SL assistance information (e.g., inter-UE co-ordination information) to determine a set of candidate resources for SL transmission within a resource selection window. In one further example, the set of candidate resources can be further refined based on sensing at UE-B. From the determined candidate resources, UE-B selects SL resources for SL transmission. The determination of candidate SL resources can be done by the physical layer of UE-B. The selection of SL resources for SL transmission can be done by the higher layers of UE-B (above the physical layer).

In a variant to the flow chart of FIG. 17, and following component 2, a UE-B requesting SL assistance information can be included in a corresponding groupcast group. A gNB(s) or eNB(s) determines UE-A ID(s) whose SL assistance information is included in the SL assistance information associated with a groupcast group. Wherein, the gNB(s) or eNB(s) can be those associated with a serving cell of UE-B or a serving cell of UE-A(s).

The above flowcharts and signaling flow diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to receive, via a groupcast message, first sidelink (SL) inter-UE coordination information; and
a processor operably coupled to the transceiver, the processor configured to:
determine SL resources for a SL transmission based on the first SL inter-UE coordination information, and
generate a second SL inter-UE coordination information,
wherein the first SL inter-UE coordination information includes information indicating resources that are not preferred,
wherein the SL resources are determined by excluding the resources that are not preferred, and
wherein the transceiver is further configured to:
transmit on a SL interface using the SL resources, and
transmit on a Uu interface, the second SL inter-UE coordination.

2. The UE of claim 1, wherein:
the transceiver is configured to receive the first SL inter-UE coordination information from a cell with a physical cell identity (PCI) different from a PCI of a serving cell of the UE, and
wherein the reception of the first SL inter-UE coordination information from the cell is based on one of:
a reference signal receive power (RSRP) of a signal from the cell with the different PCI,
a location of the UE, or
a distance between the UE and the cell with the different PCI.

3. The UE of claim 1, wherein the transceiver is further configured to transmit, to a gNB, a request for the first SL inter-UE coordination information.

4. The UE of claim 3, wherein the request includes at least one of:
location information of the UE,
motion information of the UE, and
information about another UE for which the first SL inter-UE coordination information is being requested.

5. The UE of claim 1, wherein:
the transceiver and processor is further configured to perform sensing on the SL interface,
the processor is further configured to generate a second SL inter-UE coordination information based on the sensing, and
the transceiver is further configured to transmit the second SL inter-UE coordination information on a Uu interface.

6. The UE of claim 5, wherein:
a message received on the Uu interface includes a request for the second SL inter-UE coordination information,
the transceiver and processor is further configured to perform sensing on the SL interface,
the processor is further configured to generate the second SL inter-UE coordination information based on the received request and the sensing, and
the transceiver is further configured to transmit the second SL inter-UE coordination information.

7. A base station (BS), comprising:
a transceiver configured to receive, on a Uu interface, a message including first sidelink (SL) inter-user equipment (UE) coordination information from a first UE, and
a processor operably coupled to the transceiver, the processor configured to:
determine SL resources for a SL transmission based on the first SL inter-UE coordination information, determine a second UE as a recipient for the first SL inter-UE coordination information, and generate second SL inter-UE coordination information from aggregation of the first SL inter-UE coordination information and other SL inter-UE coordination information, wherein the transceiver is further configured to transmit the second SL inter-UE coordination information to the second UE via a groupcast message, wherein the second SL inter-UE coordination information includes information indicating resources that are not preferred, and wherein the SL resources are determined by excluding the resources that are not preferred.

8. The BS of claim 7, wherein:

the processor is further configured to determine third SL inter-UE coordination information for UEs in a neighbor cell, and the transceiver is further configured to transmit the third SL inter-UE coordination information to a BS of the neighbor cell through a backhaul interface.

9. The BS of claim 7, wherein:

the transceiver is further configured to receive third SL inter-UE coordination information from another BS through a backhaul interface, and the processor is further configured to aggregate the third SL inter-UE coordination information into the second SL inter-UE coordination information.

10. The BS of claim 7, wherein the transceiver is configured to receive, on the Uu interface, a request for the second SL inter-UE coordination information from the second UE.

11. The BS of claim 7, wherein the transceiver is configured to transmit, on the Uu interface, a request for the first SL inter-UE coordination information to the first UE.

12. The BS of claim 7, wherein:

the processor and the transceiver are configured to perform sensing on a SL interface, the processor is further configured to determine third SL inter-UE coordination information based on the sensing, and the processor is further configured to aggregate the third SL inter-UE coordination information into the second SL inter-UE coordination information.

13. A method of operating a base station (BS), the method comprising:

receiving, on a Uu interface, a message including first sidelink (SL) inter-user equipment (UE) coordination information from a first UE, determining SL resources for a SL transmission based on the first SL inter-UE coordination information, determining a second UE as a recipient for the first SL inter-UE coordination information, and generating second SL inter-UE coordination information from aggregation of the first SL inter-UE coordination information and other SL inter-UE coordination information, and transmitting the second SL inter-UE coordination information to the second UE via a groupcast message, wherein the second SL inter-UE coordination information includes information indicating resources that are not preferred, and wherein the SL resources are determined by excluding the resources that are not preferred.

14. The method of claim 13, further comprising:

determining third SL inter-UE coordination information for UEs in a neighbor cell, and transmitting the third SL inter-UE coordination information to a BS of the neighbor cell through a backhaul interface.

15. The method of claim 13, further comprising:

receiving a third SL inter-UE coordination information from another BS through a backhaul interface, and aggregating the third SL inter-UE coordination information into the second SL inter-UE coordination information.

16. The method of claim 13, further comprising receiving, on the Uu interface, a request for the second SL inter-UE coordination information from the second UE.

17. The method of claim 13, further comprising transmitting, on the Uu interface, a request for the first SL inter-UE coordination information to the first UE.

18. The method of claim 13, further comprising:

performing sensing on a SL interface;

determining third SL inter-UE coordination information based on the sensing; and aggregating the third SL inter-UE coordination information into the second SL inter-UE coordination information.

\* \* \* \* \*